(12) United States Patent
Yamano et al.

(10) Patent No.: US 10,838,500 B2
(45) Date of Patent: Nov. 17, 2020

(54) INFORMATION PROCESSING DEVICE, METHOD, AND COMPUTER PROGRAM

(71) Applicant: SONY CORPORATION, Tokyo (JP)

(72) Inventors: Ikuo Yamano, Tokyo (JP); Yusuke Nakagawa, Kanagawa (JP); Ryo Yokoyama, Tokyo (JP); Akihiro Komori, Tokyo (JP); Takashi Nozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/413,140

(22) Filed: May 15, 2019

(65) Prior Publication Data

US 2020/0026355 A1    Jan. 23, 2020

Related U.S. Application Data

(63) Continuation of application No. 15/742,651, filed as application No. PCT/JP2016/075581 on Aug. 31, 2016, now Pat. No. 10,331,214.

(Continued)

(51) Int. Cl.
*G06F 3/0487* (2013.01)
*G06F 3/01* (2006.01)
(Continued)

(52) U.S. Cl.
CPC ............ *G06F 3/016* (2013.01); *A41D 1/002* (2013.01); *A41D 1/02* (2013.01); *A63F 13/211* (2014.09);
(Continued)

(58) Field of Classification Search
CPC ........ G06F 3/011; G06F 3/016; G06F 3/0481; G06F 3/0487; A63F 13/211;
(Continued)

(56) References Cited

U.S. PATENT DOCUMENTS 7,800,609 B2   9/2010 Tarr et al.
10,331,214 B2 * 6/2019 Yamano ................. G06F 1/163
(Continued)

FOREIGN PATENT DOCUMENTS

EP    1928162 A1   6/2008
EP    2293532 A1   3/2011
(Continued)

OTHER PUBLICATIONS

Mar. 8, 2019, European Search Report issued for related EP Application No. 16844261.4.

(Continued)

*Primary Examiner* — Antonio A Caschera
(74) *Attorney, Agent, or Firm* — Paratus Law Group, PLLC

(57) ABSTRACT

An information processing device to allow a user to receive haptic feedback with a more sense of presence, the information processing device including: a virtual space data generating unit configured to generate data related to a virtual space including a virtual object having an attribute; a listener placing unit configured to place a listener for detecting contact with the virtual object; a virtual object in which the listener is placed; and a haptic data generating unit configured to generate haptic data for causing a haptic device to be operated on a basis of at least one of attribute information of the virtual object and attribute information of another virtual object when the virtual object comes into contact with the other virtual object.

16 Claims, 21 Drawing Sheets

Related U.S. Application Data

(60) Provisional application No. 62/215,572, filed on Sep. 8, 2015.

(51) Int. Cl.
| | | |
|---|---|---|
| *A63F 13/24* | (2014.01) | |
| *A63F 13/218* | (2014.01) | |
| *H04M 19/04* | (2006.01) | |
| *A63F 13/211* | (2014.01) | |
| *A63F 13/212* | (2014.01) | |
| *A63F 13/215* | (2014.01) | |
| *A63F 13/235* | (2014.01) | |
| *A63F 13/285* | (2014.01) | |
| *A63F 13/31* | (2014.01) | |
| *A63F 13/428* | (2014.01) | |
| *A63F 13/54* | (2014.01) | |
| *A63F 13/577* | (2014.01) | |
| *A63F 13/92* | (2014.01) | |
| *A41D 1/00* | (2018.01) | |
| *A41D 1/02* | (2006.01) | |
| *G02B 27/01* | (2006.01) | |
| *A63F 13/426* | (2014.01) | |

(52) U.S. Cl.
CPC .......... *A63F 13/212* (2014.09); *A63F 13/215* (2014.09); *A63F 13/218* (2014.09); *A63F 13/235* (2014.09); *A63F 13/24* (2014.09); *A63F 13/285* (2014.09); *A63F 13/31* (2014.09); *A63F 13/428* (2014.09); *A63F 13/54* (2014.09); *A63F 13/577* (2014.09); *A63F 13/92* (2014.09); *G02B 27/0172* (2013.01); *G06F 3/011* (2013.01); *G06F 3/014* (2013.01); *H04M 19/04* (2013.01); *A63F 13/426* (2014.09); *A63F 2250/166* (2013.01); *A63F 2300/308* (2013.01); *G02B 2027/014* (2013.01); *G06F 3/0487* (2013.01)

(58) Field of Classification Search
CPC . A63F 13/212; A63F 13/285; G06K 9/00671; G06T 19/006
See application file for complete search history.

(56) References Cited

U.S. PATENT DOCUMENTS

| | | |
|---|---|---|
| 2003/0112281 A1 | 6/2003 | Sriram et al. |
| 2008/0094351 A1 | 4/2008 | Nogami et al. |
| 2011/0021272 A1 | 1/2011 | Grant et al. |
| 2011/0115709 A1* | 5/2011 | Cruz-Hernandez ..... G06F 3/016 345/168 |
| 2013/0038603 A1 | 2/2013 | Bae |
| 2014/0265650 A1 | 9/2014 | Jeon |
| 2014/0281958 A1 | 9/2014 | Birnbaum et al. |
| 2015/0070145 A1 | 3/2015 | Mar et al. |

FOREIGN PATENT DOCUMENTS

| | | |
|---|---|---|
| EP | 2988200 A1 | 2/2016 |
| EP | 3483701 A1 | 5/2019 |
| JP | 11-085400 A | 3/1999 |
| JP | 2005-301827 A | 10/2005 |
| JP | 2008-134990 A | 6/2008 |
| JP | 2011-059821 A | 3/2011 |
| JP | 2012-187148 A | 10/2012 |
| JP | 2013-500516 A | 1/2013 |
| JP | 2013-054645 A | 3/2013 |
| JP | 2013-150201 A | 8/2013 |
| JP | 2014-179088 A | 9/2014 |
| JP | 2015-062115 A | 4/2015 |
| WO | WO 2011/041535 A1 | 4/2011 |
| WO | WO 2013/018267 A1 | 2/2013 |

OTHER PUBLICATIONS

Mar. 13, 2019, European Search Report issued for related EP Application No. 16844471.9.
Jun. 29, 2020, European Search Report issued for related EP application No. 20166761.5.

* cited by examiner

FIG. 19
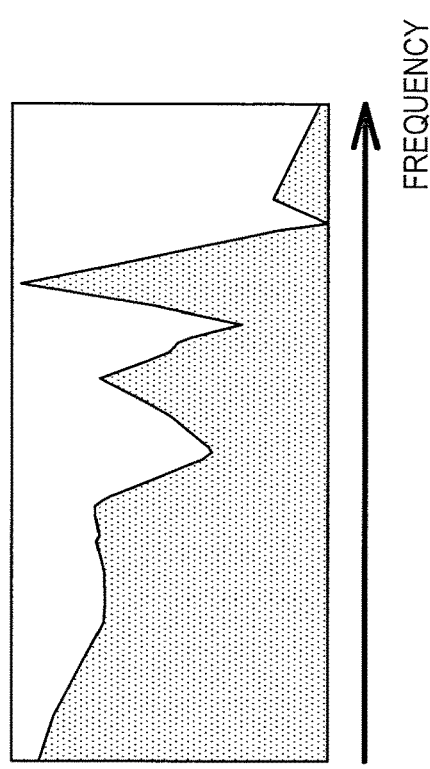
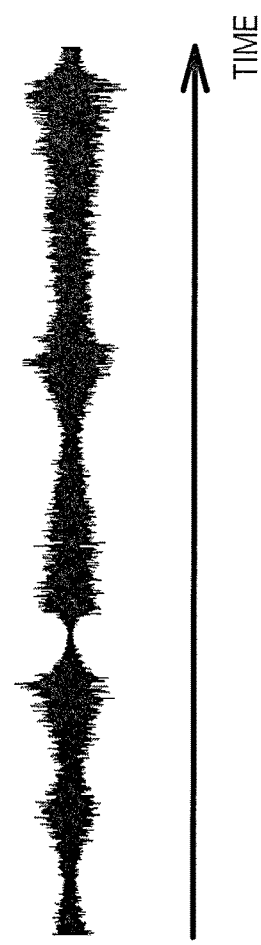

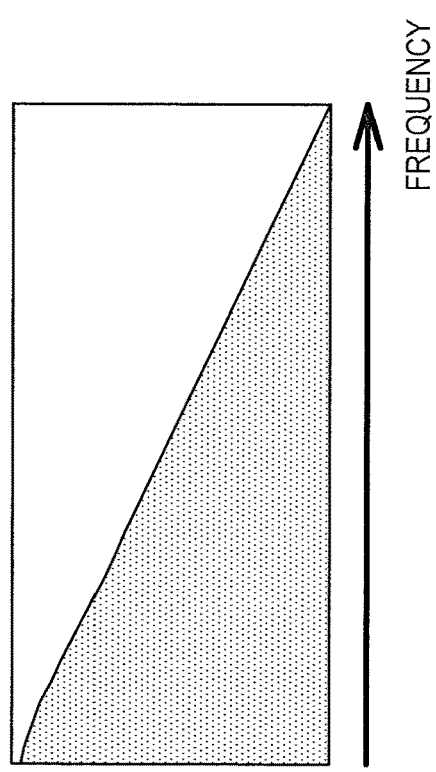
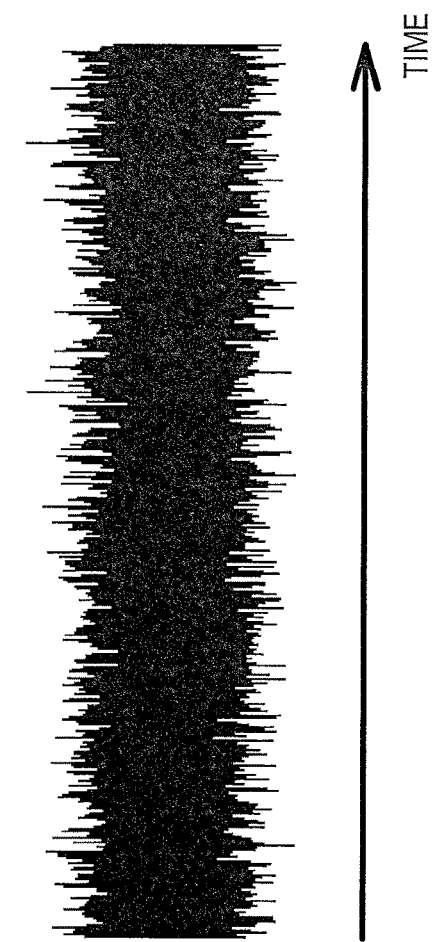
FIG. 20

INFORMATION PROCESSING DEVICE, METHOD, AND COMPUTER PROGRAM

CROSS REFERENCE TO PRIOR APPLICATION

This application is a continuation of U.S. patent application Ser. No. 15/742,651 (filed on Jan. 8, 2018), which is a National Stage Patent Application of PCT International Patent Application No. PCT/JP2016/075581 (filed on Aug. 31, 2016) under 35 U.S.C. § 371, which claims priority to U.S. Provisional Patent Application No. 62/215,572 (filed on Sep. 8, 2015), which are all hereby incorporated by reference in their entirety.

TECHNICAL FIELD

The present disclosure relates to an information processing device, a method, and a computer program.

BACKGROUND ART

A controller used in a smartphone or a game includes a vibrating device for giving haptic feedback to a user.

An input device for inputting characters is disclosed in Patent Literature 1, and the input device disclosed in Patent Literature 1 gives feedback of vibration corresponding to a manipulation of the user to the user.

CITATION LIST

Patent Literature

Patent Literature 1: JP 2011-59821A

DISCLOSURE OF INVENTION

Technical Problem

In the input device as disclosed in Patent Literature 1, since feedback of monotonic vibration is given to the user, the user is unable to receive haptic feedback with a sense of presence. In this regard, the present disclosure proposes an information processing device, a method, and a computer program, which are capable of enabling the user to receive haptic feedback with a more sense of presence.

Solution to Problem

According to the present disclosure, there is provided an information processing device, including: a virtual space data generating unit configured to generate data related to a virtual space including a virtual object having an attribute; a listener placing unit configured to place a listener for detecting a contact with the virtual object; a virtual object in which the listener is placed; and a haptic data generating unit configured to generate haptic data for causing a haptic device to be operated on a basis of at least one of attribute information of the virtual object and attribute information of another virtual object when the virtual object comes into contact with the other virtual object.

Further, according to the present disclosure, there is provided a method, including: generating data related to a virtual space including a virtual object having an attribute; placing a listener for detecting a contact with the virtual object; causing the listener to be placed in the virtual object; and generating haptic data for causing a haptic device to be operated on a basis of at least one of attribute information of the virtual object and attribute information of another virtual object when the virtual object comes into contact with the other virtual object.

Further, according to the present disclosure, there is provided a computer program causing a processor to execute generating data related to a virtual space including a virtual object having an attribute, placing a listener for detecting a contact with the virtual object, causing the listener to be placed in the virtual object, and generating haptic data for causing a haptic device to be operated on a basis of at least one of attribute information of the virtual object and attribute information of another virtual object when the virtual object comes into contact with the other virtual object.

Advantageous Effects of Invention

As described above, according to the present disclosure, the user can receive the haptic feedback with a more sense of presence.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is a diagram illustrating a vibration data generation method in an embodiment of the present disclosure.

FIG. 20 is a diagram illustrating a vibration data generation method in an embodiment of the present disclosure.

MODE(S) FOR CARRYING OUT THE INVENTION

Figure 1:
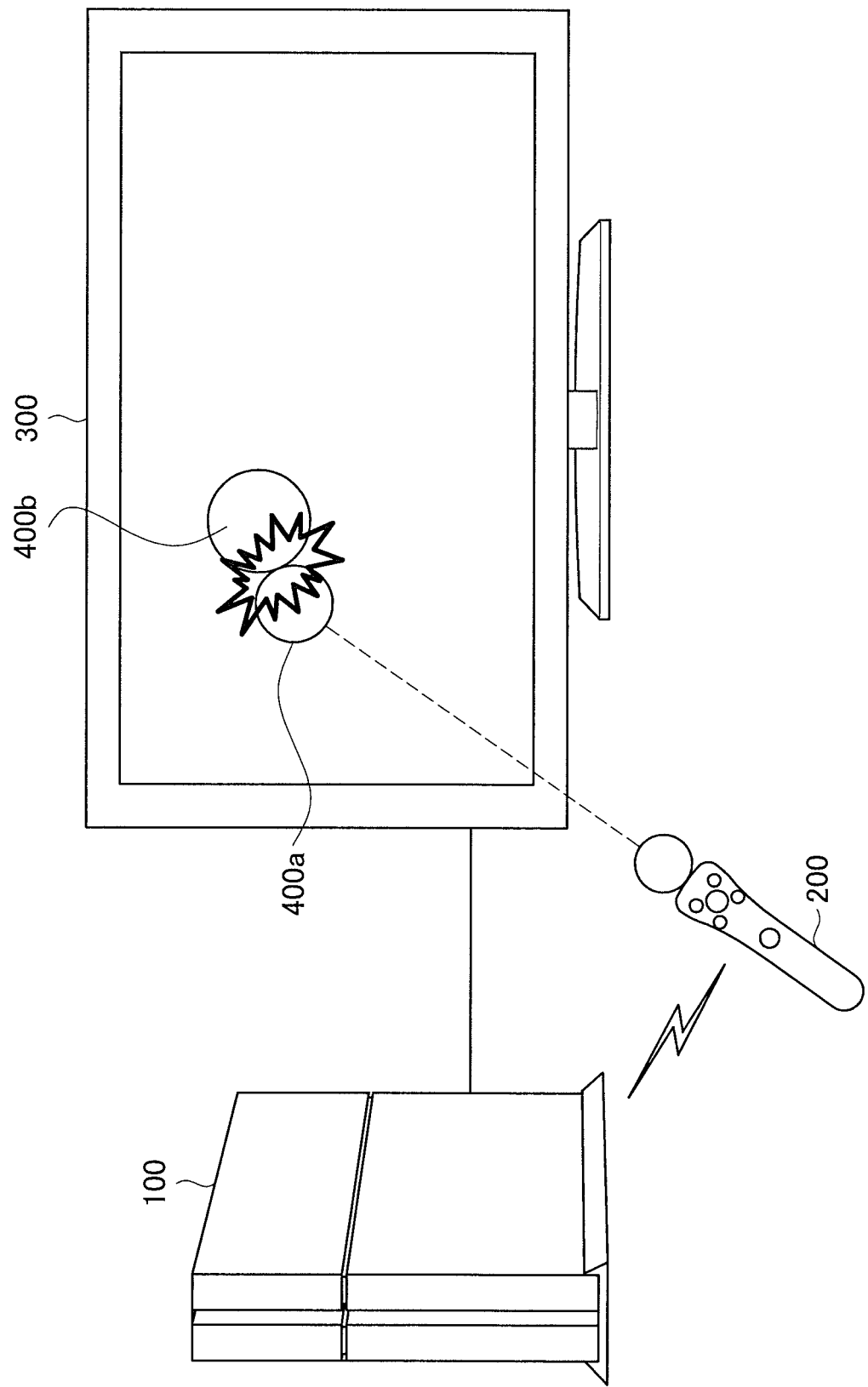
FIG. 1 is a diagram illustrating a system configuration according to the present embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Configuration of system of present embodiment
2. Listener of detecting contact with virtual object
3. Feedback of vibration to user
4. Process in system of present embodiment
5. Feedback caused by non-contact event on virtual manipulation object
6. Feedback of vibration based on shape and material of virtual object
7. Wearable terminal with plurality of vibrating devices
8. Mode in which listener detects contact
9. Wearable terminal with speaker
10. Vibration data generation method
11. Supplement
12. Conclusion 1. Configuration of System of Present Embodiment FIG. 1 is a diagram illustrating a configuration of a system according to an embodiment of the present disclosure. The system according to the present embodiment includes a game machine 100, a controller 200, and a display device 300. The game machine 100 reads game software or the like stored in a storage medium and performs a process related to the game software. For example, the game machine 100 generates data of a virtual space for performing a game, and the game machine 100 also performs a process associated with a virtual manipulation object 400a manipulated by the user on the basis of information provided from the controller 200.

Further, the game machine 100 transmits generated video data related to a virtual space of a game to the display device 300. Further, in an example illustrated in FIG. 1, the virtual manipulation object 400a manipulated by the user and other spherical virtual object 400b are placed in the virtual space. Further, the game machine 100 will be described below as an example of an information processing device that generates data related to the virtual space.

The controller 200 is used for the user to manipulate the virtual manipulation object 400a. The controller 200 is wirelessly connected to the game machine 100 and transmits information related to the manipulation of the user to the game machine 100. The display device 300 receives the video data from the game machine 100 and displays the virtual space related to the game.

Figure 2:
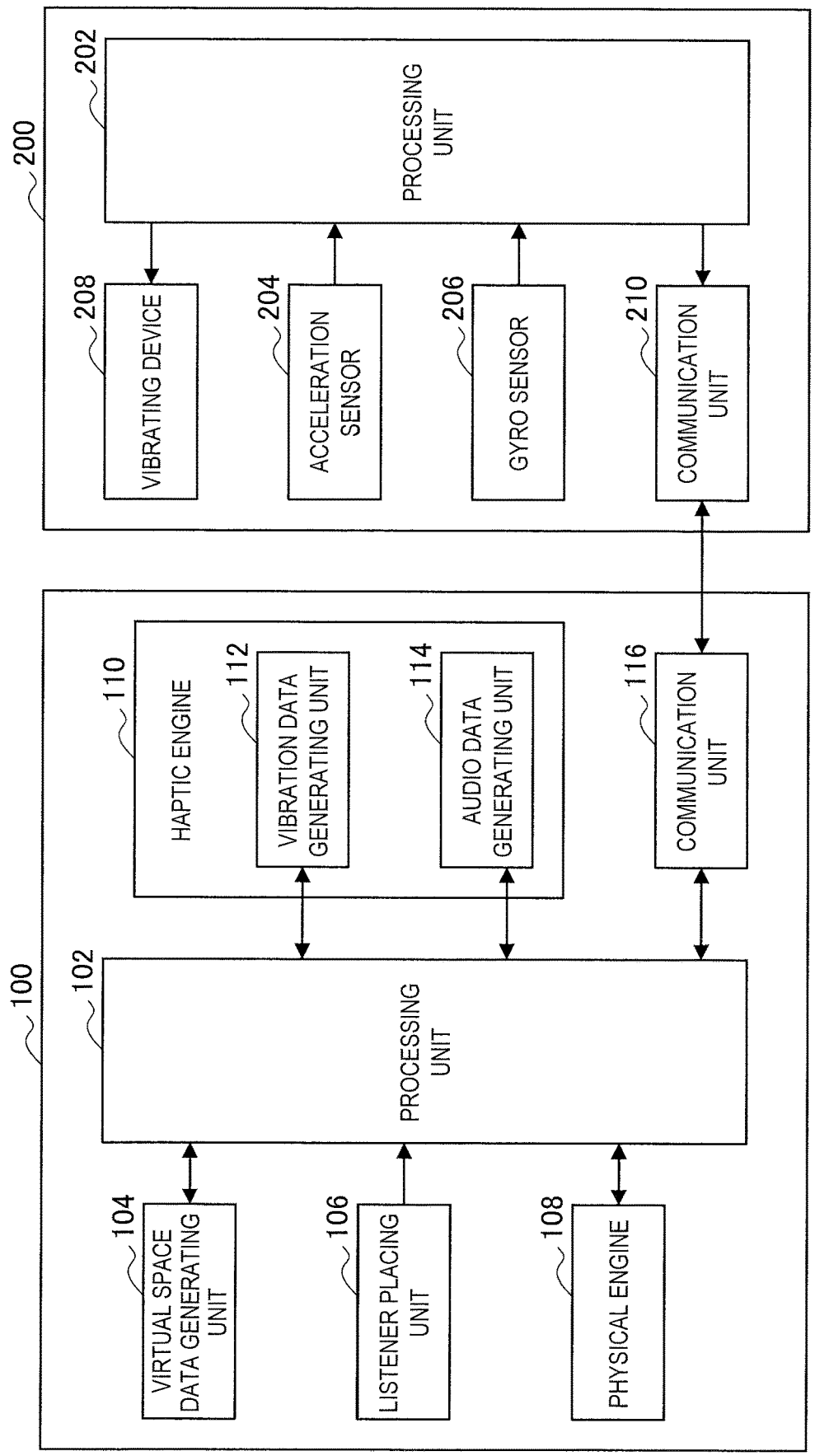
FIG. 2 is a block diagram illustrating a configuration of a system according to an embodiment of the present disclosure.

The overview of the system according to the present embodiment has been described above. An internal configuration of the system according to the present embodiment will be described below. FIG. 2 is a block diagram illustrating the internal configuration of the system according to the present embodiment. Further, internal configurations of the game machine 100 and the controller 200 will be described with reference to FIG. 2.

The game machine 100 of the present embodiment includes a processing unit 102, a virtual space data generating unit 104, a listener placing unit 106, a physical engine 108, a haptic engine 110, and a communication unit 116. Further, the haptic engine 110 includes a vibration data generating unit 112 and an audio data generating unit 114. The processing unit 102 is connected to the respective units of the game machine 100 and processes various information received from the respective units and exchanges information with the respective units. The virtual space data generating unit 104 generates data related to the virtual space on the basis of information of game software or the like. The data related to the virtual space generated by the virtual space data generating unit 104 includes information related to the virtual object 400 placed in the virtual space.

The listener placing unit 106 places a listener for detecting contact with the virtual manipulation object 400a in the virtual manipulation object 400a manipulated by the user. A listener placement method will be described later. The physical engine 108 performs various operations in the virtual space. For example, the physical engine 108 performs contact determination, a rigid body operation, a fluid operation, and the like in the virtual space. Further, examples of parameters processed by the physical engine 108 includes attribute information of the virtual object 400 such as a mass, a degree of rigidity, a material, a size, a shape, a position, and a speed of the virtual object 400. In other words, the parameters processed by the physical engine 108 may include information related to a contact position when a plurality of virtual objects 400 come into contact with each other and a relative speed when the virtual objects 400 come into contact with each other.

The haptic engine 110 includes the vibration data generating unit 112 that generates vibration data on the basis of an operation result of the physical engine 108 and the audio data generating unit 114 that generates audio data. The vibration data generating unit 112 generates the vibration data for vibrating a vibrating device 208 of the controller 200 on the basis of the parameters processed by the physical engine 108. The audio data generating unit 114 generates the audio data on the basis of the parameters processed by the physical engine 108. Further, the vibration data generating unit 112 is an example of a haptic data generating unit.

The communication unit 116 is used to perform transmission and reception of information with other devices such as the controller 200. The communication unit 116 may be a near field communication (NFC) interface such as Bluetooth (a registered trademark). Further, the communication unit 116 is not limited to the interface described above and may be an NFC interface such as ZigBee (a registered trademark).

The configuration of game machine 100 has been described above. A configuration of the controller 200 will be described below. The controller 200 of the present embodiment includes a processing unit 202, an acceleration sensor 204, a gyro sensor 206, the vibrating device 208, and a communication unit 210.

The processing unit 202 processes the information received from the game machine 100 and processes information provided from the acceleration sensor 204 and the gyro sensor 206 of the controller 200. For example, the processing unit 202 may process information acquired from the acceleration sensor 204 and the gyro sensor 206 and calculate a status of the controller 200 such as an acceleration or an inclination of the controller 200. Further, the processing unit 202 may simply transmit the information obtained from the acceleration sensor 204 and the gyro sensor 206 to the game machine 100, and the game machine 100 receiving the information may determine the status of the controller 200.

The acceleration sensor 204 detects the acceleration of the controller 200 on the basis of the manipulation of the user. Further, the gyro sensor 206 detects an angular speed and an angular acceleration of the controller 200 on the basis of the manipulation of the user. The vibrating device 208 gives haptic feedback of vibration to the user by vibrating on the basis of the vibration data generated by the game machine 100. Further, the vibrating device is an example of a haptic device.

The vibrating device 208 may be a device equipped with a vibrator such as an eccentric motor with a shape-biased weight attached to a rotation axis of a motor. Further, the vibrating device 208 may be a device equipped with a vibrator such as a voice coil motor, a piezo actuator, or an electromagnetic linear actuator. Since the voice coil motor can vibrate in a wide band and has a fast response speed, the voice coil motor can perform more various haptic feedback than the eccentric motor. Further, the voice coil motor can generate a sound of an audible band. Further, the communication unit 210 is used to perform transmission and reception of information with other devices such as the game machine 100.

2. Listener of Detecting Contact with Virtual Object

The configurations of game machine 100 and controller 200 according to the present embodiment have been described above. The listener placed in the virtual manipulation object 400a manipulated by the user in the present embodiment will be described below.

Figure 3:
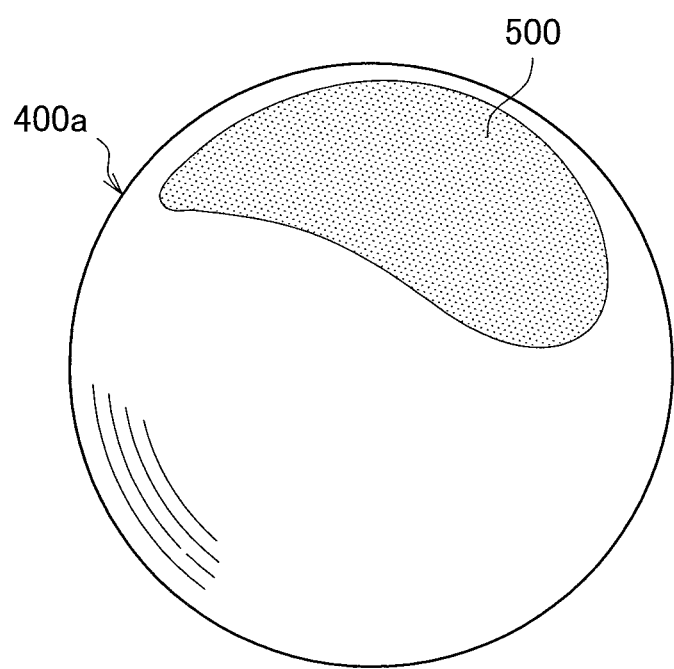
FIG. 3 is a diagram illustrating a virtual object and a listener placed in a virtual object.

FIG. 3 is a diagram conceptually illustrating a listener 500 according to the present disclosure. As illustrated in FIG. 3, the listener 500 is placed in the virtual manipulation object 400a manipulated by the user. The listener 500 detects a contact with the placed virtual manipulation object 400a, and in a case in which another virtual object 400 comes into contact with the listener 500, the physical engine 108 recognizes the contact, and the vibration data generating unit 112 generates the vibration data on the basis of information provided from the physical engine 108. In other words, when another virtual object 400 comes into contact with the listener 500, the vibrating device 208 of the controller 200 vibrates, and the user can receive haptic feedback indicating that another virtual object 400 comes into contact with the virtual manipulation object 400a.

Further, in FIG. 3, the virtual manipulation object 400a manipulated by the user is indicated by a sphere, but the virtual manipulation object 400a may be a human-like shape or a rod shape. Further, in FIG. 3, the listener 500 is placed in a part of the virtual manipulation object 400a, but the listener 500 may be placed in the entire virtual manipulation object 400a. Further, the listener 500 may be placed on the surface of the virtual manipulation object 400a or may be placed inside the virtual manipulation object 400a, and the method of placing the listener 500 is not particularly limited.

Further, the listener 500 may not only detect the contact with the virtual manipulation object 400a but also detect a sound reaching the virtual manipulation object 400a. Further, the listener 500 may detect a sound caused by another virtual object 400 coming into contact with the virtual manipulation object 400a.

3. Feedback of Vibration to User

Figure 4:
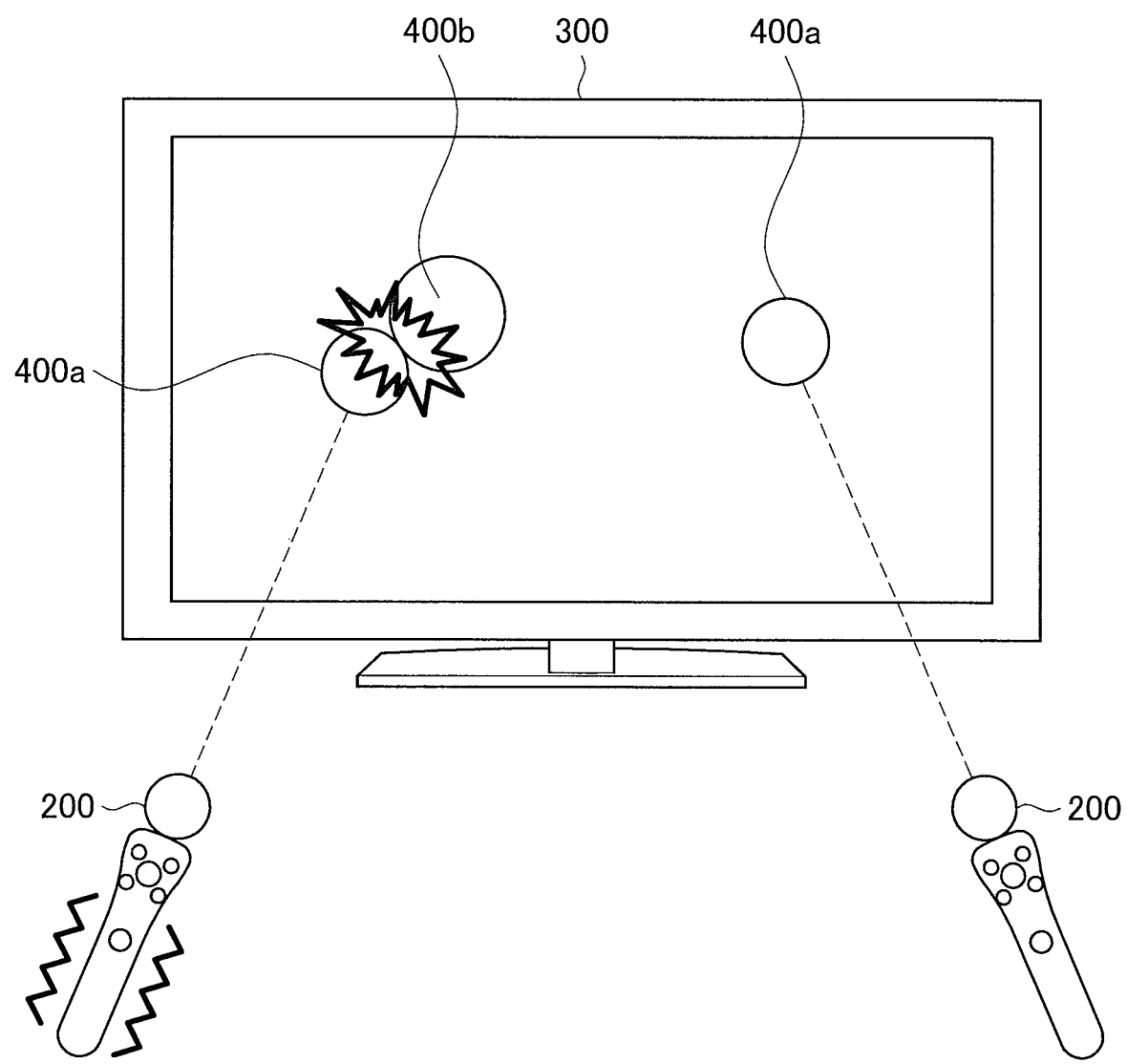
FIG. 4 is a diagram illustrating an event in which feedback of vibration occurs in an embodiment of the present disclosure.

The listener 500 of detecting the contact with the virtual manipulation object 400a has been described above. An example in which the feedback of vibration is given to the user in the system according to the present embodiment will be described below. FIG. 4 illustrates an example in which the user manipulates the virtual manipulation object 400a by manipulating the controller 200.

In FIG. 4, the number of controllers 200 and the number of virtual manipulation objects 400a corresponding to the controllers 200 are two, and an event in which the spherical virtual object 400b collides with one virtual manipulation object 400a occurs. At this time, as illustrated in FIG. 4, the controller 200 corresponding to the virtual manipulation object 400a colliding with the spherical virtual object 400b vibrates. On the other hand, the controller 200 corresponding to the virtual manipulation object 400a not colliding with the spherical virtual object 400b does not vibrate.

In the system according to the present embodiment, each virtual object 400 has an attribute associated with the virtual object 400, and each virtual object 400 has the vibration data corresponding to the attribute. Further, the vibration data generating unit 112 may generate the vibration data on the basis of the vibration data of each virtual object 400. Further, as described above, the attribute of the virtual object 400 may include a mass, a degree of rigidity, a material, a size, a shape, and the like of the virtual object 400.

When the user is playing a game or the like, the user may want to receive feedback based on an attribute of the virtual object 400 coming into contact with the virtual manipulation object 400a instead of the sense of touch for the virtual manipulation object 400a manipulated by the user. Therefore, in the system according to the present embodiment, the vibration data is generated on the basis of the attribute of another virtual object 400b coming into contact with the virtual manipulation object 400a.

Thus, for example, the vibration that is fed back to the user may increases as the mass of another virtual object 400b colliding with the virtual manipulation object 400a increases. Further, a time in which the controller 200 vibrates may decrease as the degree of rigidity of another virtual object 400 colliding with the virtual manipulation object 400a increases. Further, when the degree of rigidity of another virtual object 400 colliding with the virtual manipulation object 400a is low, vibration having a long reverberation remains may be fed back to the user.

Further, the vibration that is fed back to the user may change in accordance with a relative speed or a contact position at which the virtual manipulation object 400a collides with another virtual object 400. For example, when the relative speed at which the virtual manipulation object 400a collides with another virtual object 400 is fast, large vibration may be fed back to the user. Further, when a corner of another virtual object 400 collides with the virtual manipulation object 400a, small short vibration may be fed back to the user.

Figure 5:
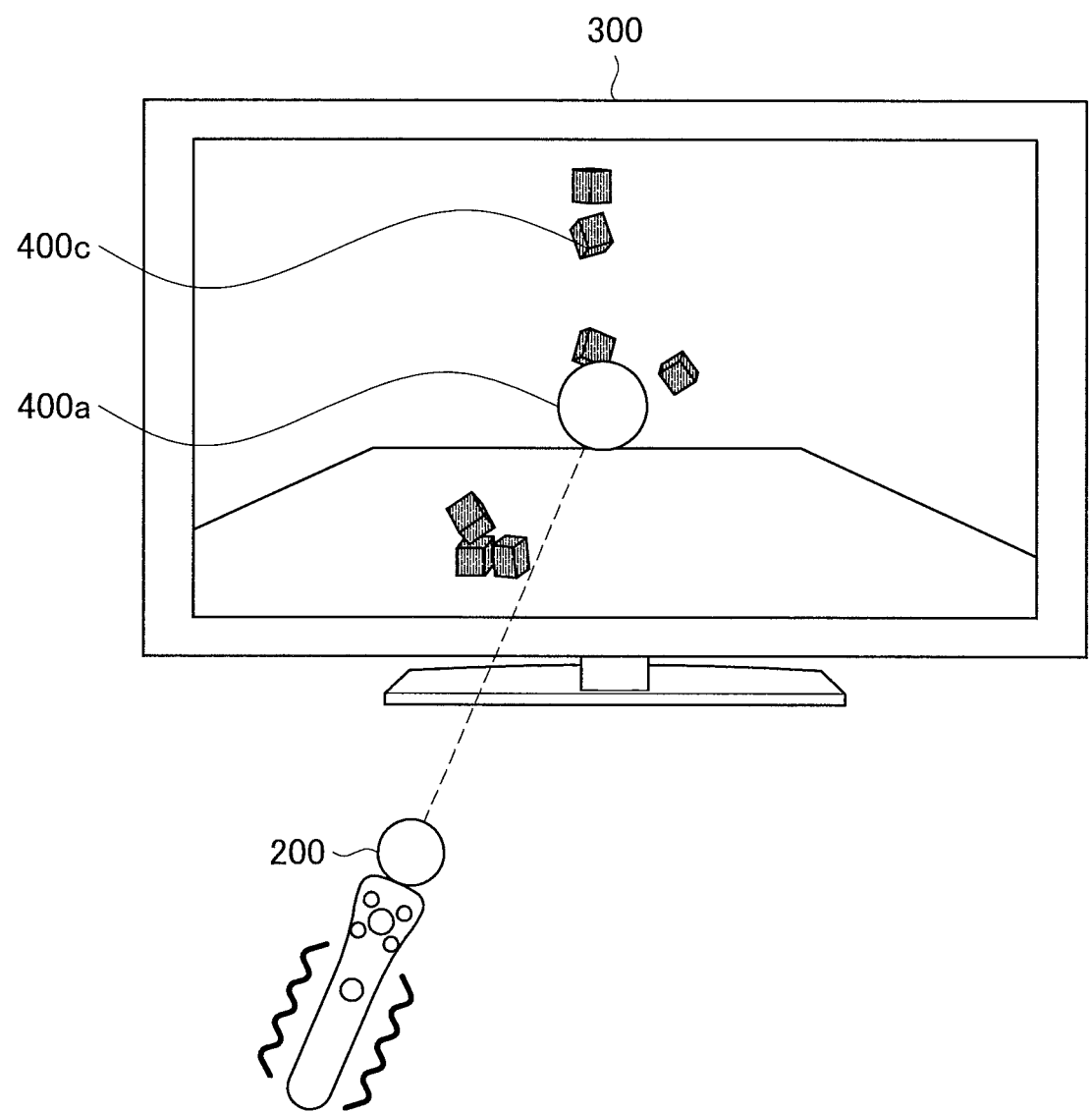
FIG. 5 is a diagram illustrating another example of an event in which feedback of vibration occurs in an embodiment of the present disclosure.

The feedback of the vibration according to the present embodiment will be described in further detail with reference to FIG. 5. FIG. 5 is a diagram illustrating a state in which a virtual object 400c of a wood cube comes into contact with the virtual manipulation object 400a. Thus, the user can get the haptic feedback of coming into contact with the wood. At this time, for example, when the virtual object 400c of the wood has an attribute having a smaller mass than the virtual object 400 having an attribute of metal, the user may receive feedback of smaller vibration than in a case in which the virtual object 400 having an attribute of metal comes into contact with it.

Further, in a case in which the corner of the virtual object 400c of the wood collides with the virtual manipulation object 400a, the user may receive feedback of smaller short vibration than in a case in which a surface of the virtual object 400c of the wood collides with the virtual manipulation object 400a.

The example in which the virtual object 400 to contact has the attribute of wood has been described with reference to FIG. 5. However, for example, in a case in which the virtual object 400 has the attribute of metal, the controller 200 may vibrate with reverberation. Further, in a case in which the virtual object 400 to contact has an attribute of rubber, the controller 200 may vibrate with no reverberation.

In other words, in a case in which the virtual object 400 to contact has the attribute of metal, the controller 200 may initially vibrate with sharp and large vibration and then vibrate such that smaller vibration than the first vibration continues for a while. Further, in a case in which the virtual object 400 to contact has the attribute of rubber, the controller 200 may initially vibrate with dully and large vibration and then not vibrate.

As described above, the controller 200 vibrates on the basis of the attribute information of the virtual object 400 coming into contact with the virtual manipulation object 400a, and thus a virtual sense of presence that the user can obtain is improved. Further, since the virtual object 400 has the vibration data corresponding to the attribute information, the vibration data is generated in real time. In other words, since the vibration data is generated in real time, the feedback of the vibration to the user is given without delay after the contact occurs in the virtual space. Further, since the vibration data is mapped with each virtual object 400, it is possible to easily give the vibration data to each virtual object 400.

Note that, in the above example, the vibration data is generated on the basis of the attribute of the virtual object 400 coming into contact with the virtual manipulation object 400a. However, the vibration data may be generated in accordance with the attribute of the virtual manipulation object 400a. Further, the vibration data may be generated on the basis of the attribute of the virtual manipulation object 400a and the attribute of the virtual object 400 coming into contact with the virtual manipulation object 400a. Accordingly, the virtual sense of presence that the user can obtain is improved.

Further, a configuration of the vibration feedback may be divided into two or more. For example, the vibration feedback may be divided into two phases of "collision" and "reverberation." At this time, in the collision phase, the controller 200 may vibrate in accordance with the attribute of the virtual manipulation object 400a, and in the reverberation phase, the controller 200 may vibrate on the basis of the attribute of the virtual object 400 coming into contact with the virtual manipulation object 400a. Further, a mode for selecting whether the controller 200 vibrates on the basis of the attribute of a colliding virtual object 400 or a collided virtual object 400 may be set, and the user may be able to select the mode.

Further, as described above, the listener 500 may detect a sound together with the contact of the virtual object 400. As described above, in FIG. 4, the controller 200 in which the spherical virtual object 400b does not come into contact with the virtual manipulation object 400a does not vibrate. However, the listener 500 of the virtual manipulation object 400a not coming into contact with the spherical virtual object 400b may detect a sound generated by the collision, and a collision sound may be output from a speaker installed in the controller 200 or the vibrating device 208.

4. Process in System of Present Embodiment

Figure 6:
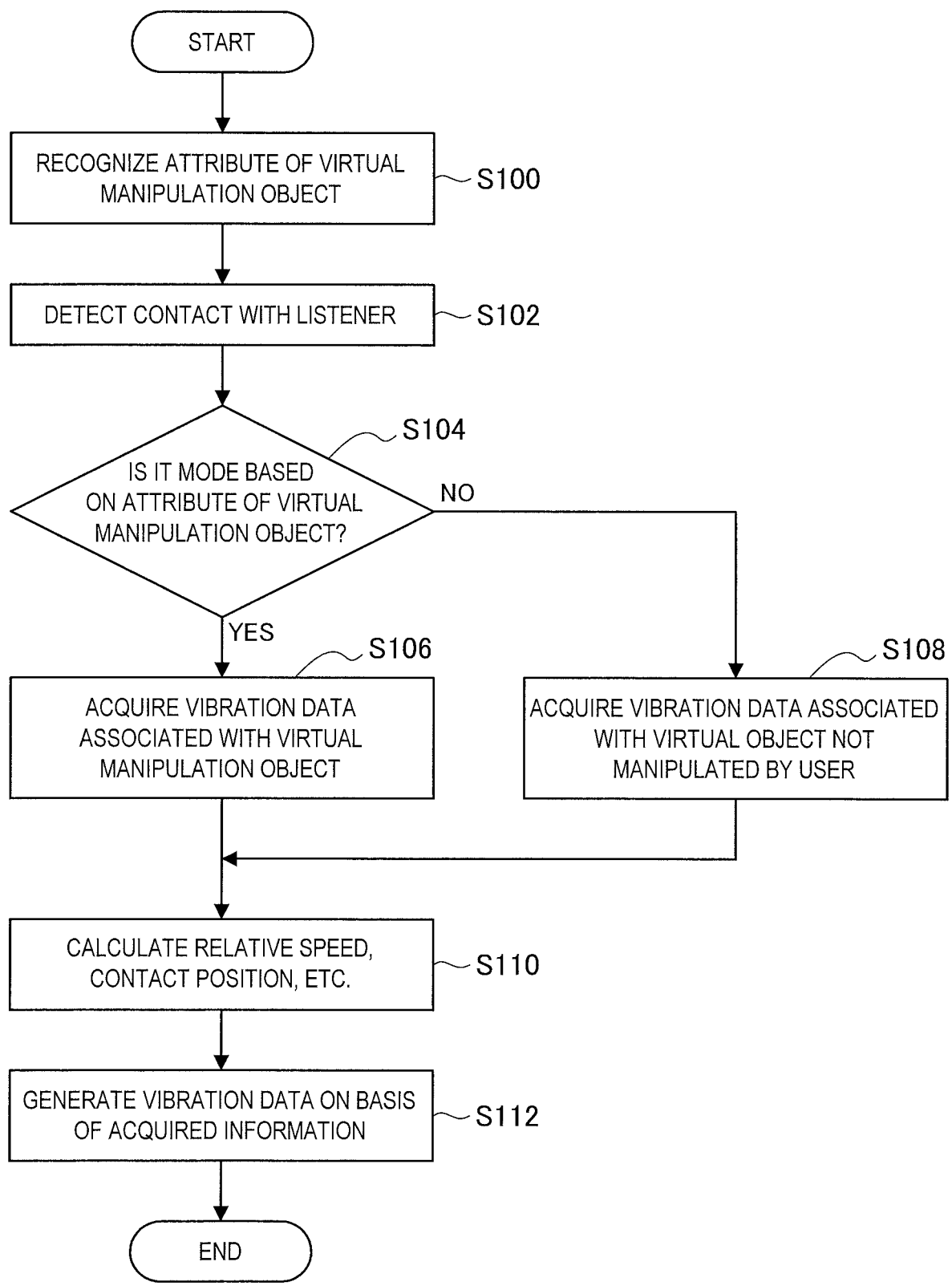
FIG. 6 is a flowchart illustrating an example of a process performed in a system according to an embodiment of the present disclosure.

The feedback of the vibration to the user in the system according to the present embodiment has been described above. A process performed by the components of the system according to the present embodiment will be described below. FIG. 6 is a flowchart illustrating a process performed by the components of the game machine 100.

First, in S100, the haptic engine 110 recognizes the attribute of the virtual manipulation object 400a manipulated by the user. Then, in S102, the physical engine 108 detects a contact with the listener 500. In other words, the physical engine 108 detects a collision or the like between another virtual object 400 and the virtual manipulation object 400a.

Then, in S104, the processing unit 102 determines whether or not a detection mode in which the listener 500 detects a contact is a mode in which the vibration is fed back on the basis of the attribute of the virtual manipulation object 400a. If the processing unit 102 determines that the detection mode in which the listener 500 detects a contact is a mode in which the vibration is fed back on the basis of the attribute of the virtual manipulation object 400a in S104, the process proceeds to S106.

In S106, the haptic engine 110 acquires the vibration data associated with the virtual manipulation object 400a. Then, in S110, the physical engine 108 calculates a relative speed, a contact position, and the like at which the virtual manipulation object 400a collides with another virtual object 400.

Then, in S112, the processing unit 102 transmits information related to the relative speed, the contact position, and the like calculated by the physical engine 108 and information related to the mode determined in S104 to the haptic engine 110, and the vibration data generating unit 112 of the haptic engine 110 generates the vibration data to be output on the basis of the acquired information. Here, the vibration data generating unit 112 generates the vibration data to be output on the basis of the vibration data based on the attribute of the virtual manipulation object 400a and the information such as the relative speed and the contact position calculated by the physical engine 108.

If the processing unit 102 determines that the detection mode in which the listener 500 detects the contact is not a mode in which the vibration is fed back on the basis of the attribute of the virtual manipulation object 400*a* in S104, the process proceeds to S108. In S108, the haptic engine 110 acquires the vibration data associated with the virtual object 400 which is not manipulated by the user, that is, the virtual object 400 colliding with the virtual manipulation object 400*a*.

Then, similarly to the process described above, in S110, the physical engine 108 calculates the relative speed, the contact position, and the like. Then, in S112, the vibration data generating unit 112 of the haptic engine 110 generates the vibration data to be output on the basis of the vibration data based on the attribute of the virtual object 400 colliding with the virtual manipulation object 400*a* and the information such as the relative speed and the contact position calculated by the physical engine 108. Further, as described above, the vibration data generating unit 112 may generate the vibration data to be output on the basis of the attribute of the virtual manipulation object 400*a*, the attribute of the virtual object 400 colliding with the virtual manipulation object 400*a*, and the information such as the relative speed and the contact position calculated by the physical engine 108.

5. Feedback Caused by Non-Contact Event on Virtual Manipulation Object

The example in which the feedback of the vibration is given when another virtual object 400 comes into contact with the virtual manipulation object 400*a* manipulated by the user has been described above. An example in which the feedback of the vibration is given when another virtual object 400 does not collide with the virtual manipulation object 400*a* will be described below.

Figure 7:
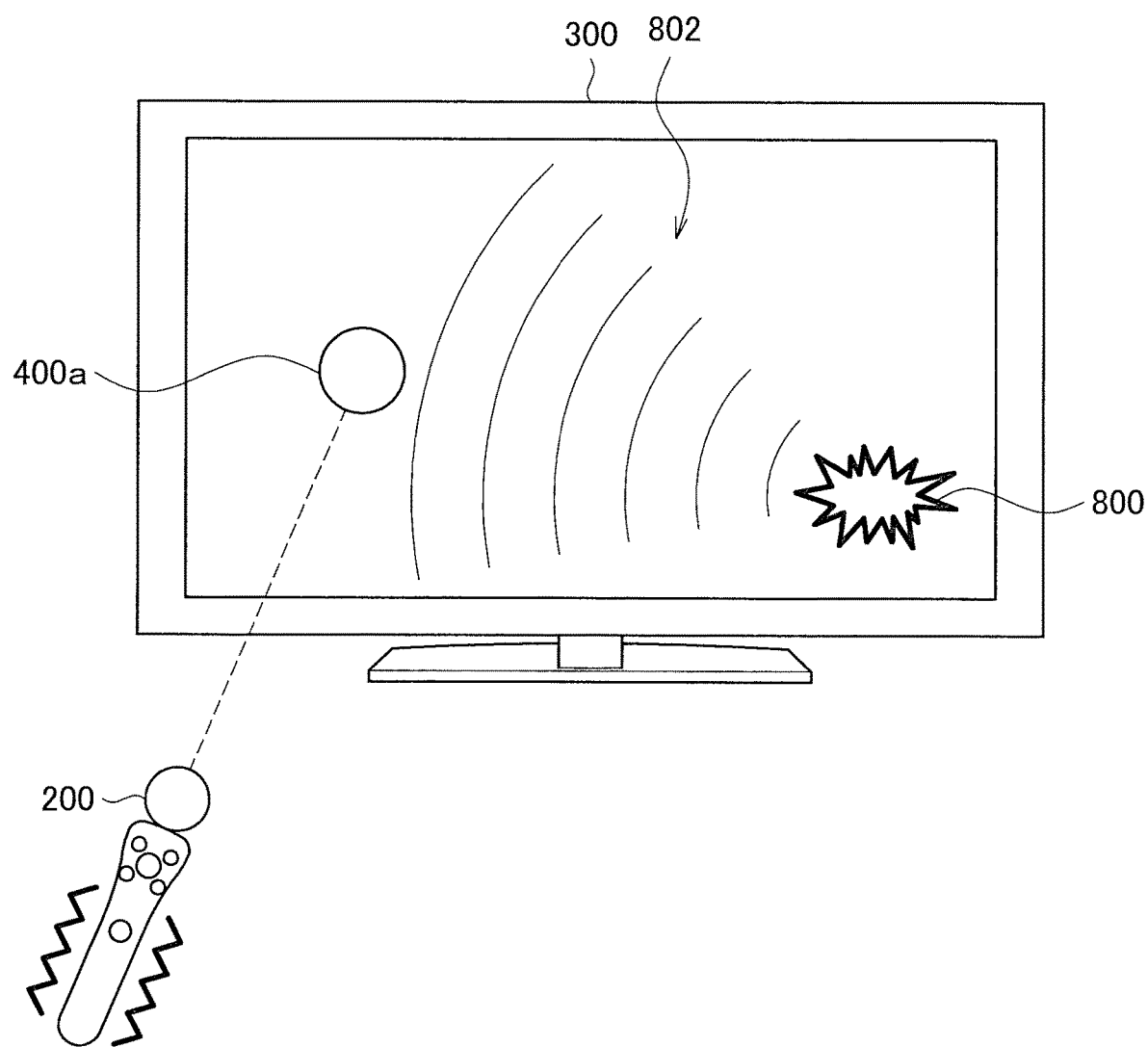
FIG. 7 is a diagram illustrating another example of an event in which feedback of vibration occurs in an embodiment of the present disclosure.

FIG. 7 is a diagram illustrating an example in which the feedback of the vibration is given on the basis of a shock wave 802 generated by a shock wave generation source 800 placed at a position apart from the virtual manipulation object 400*a*. Further, the shock wave generation source 800 may be, for example, an explosion, and propagation of the shock wave 802 may be simulated by the physical engine 108 within the virtual space.

In the example of FIG. 7, when the shock wave 802 caused by the explosion occurring in the virtual space reaches the listener 500 placed in the virtual manipulation object 400*a*, the feedback of the vibration is given. At this time, the feedback of the vibration may be given in accordance with a nature of a medium between the virtual manipulation object 400*a* and the shock wave generation source 800.

For example, the feedback of the vibration in a case in which the medium is air and the feedback of the vibration in a case in which the medium is water may differ in a strength of the vibration. At this time, in a case in which the medium is water, the vibration may be weaker than the vibration in a case in which the medium is air. This is because a propagation characteristic of the simulated shock wave 802 differs depending on a medium.

Accordingly, the user can feel that the virtual manipulation object 400*a* manipulated by the user is, for example, in the water by the feedback of the vibration, and thus the virtual sense of presence that the user can obtain is further improved.

Further, the vibration data may be generated simply in accordance with a distance between the shock wave generation source 800 and the virtual manipulation object 400*a* instead of the propagation of the shock wave 802 simulated within the virtual space. Accordingly, the feedback of the vibration is given by the physical engine 108 having a simpler configuration as well.

6. Feedback of Vibration Based on Shape and Material of Virtual Object

The example in which the feedback of the vibration is given on the basis of the shock wave 802 has been described above. The feedback of the vibration based on a shape and a material of the virtual object 400 will be described below in further detail.

FIGS. 8 to 11 are diagrams illustrating an example in which the virtual manipulation object 400*a* passes over a semicircular virtual object 400*d*. The feedback of the vibration in such a situation will be described below. Further, the semicircular virtual object 400*d* has a surface having small friction (having a slippery feel).

Figure 8:
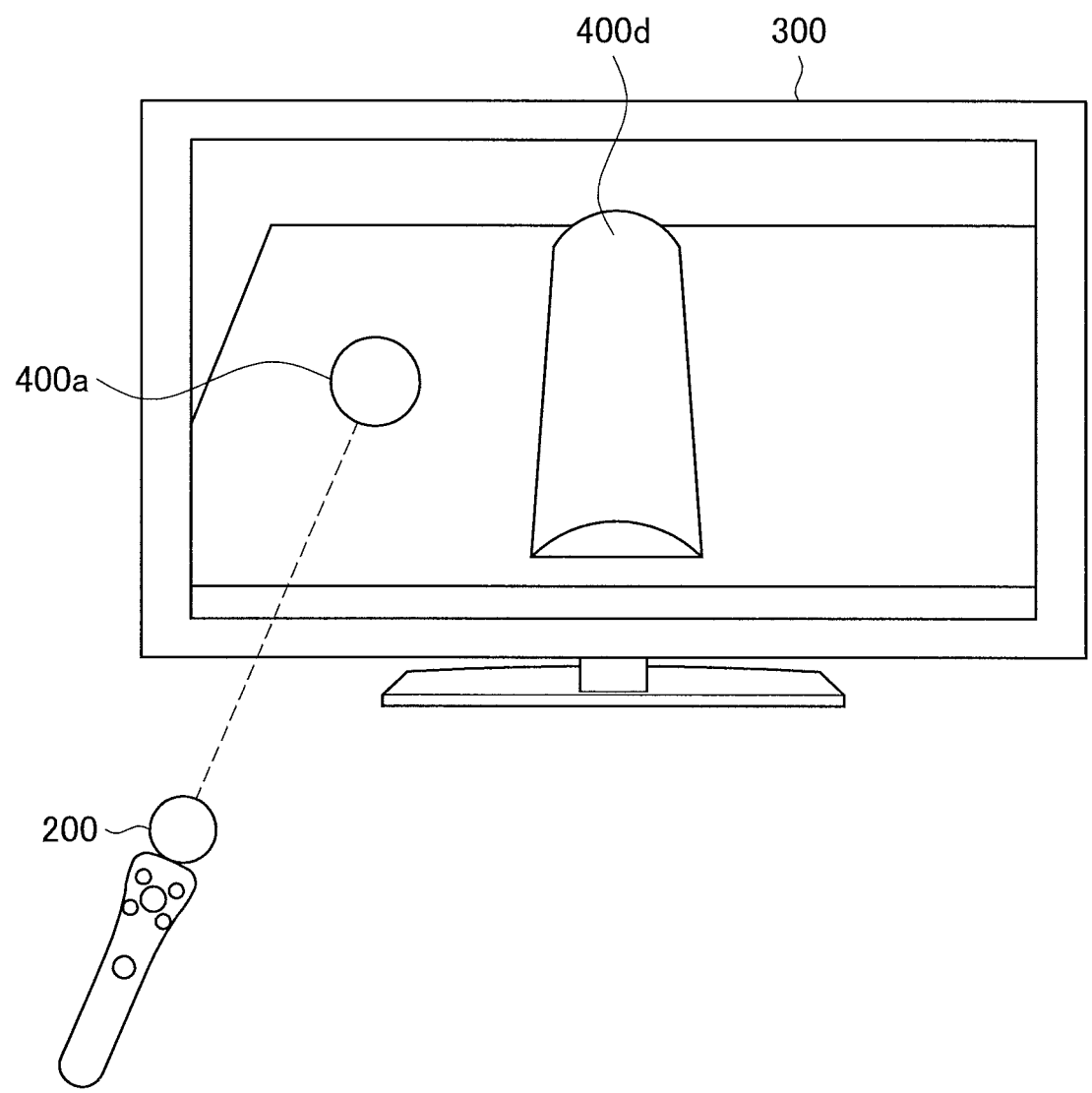
FIG. 8 is a diagram illustrating a method in which a shape and texture of a virtual object are expressed by vibration.
Figure 9:
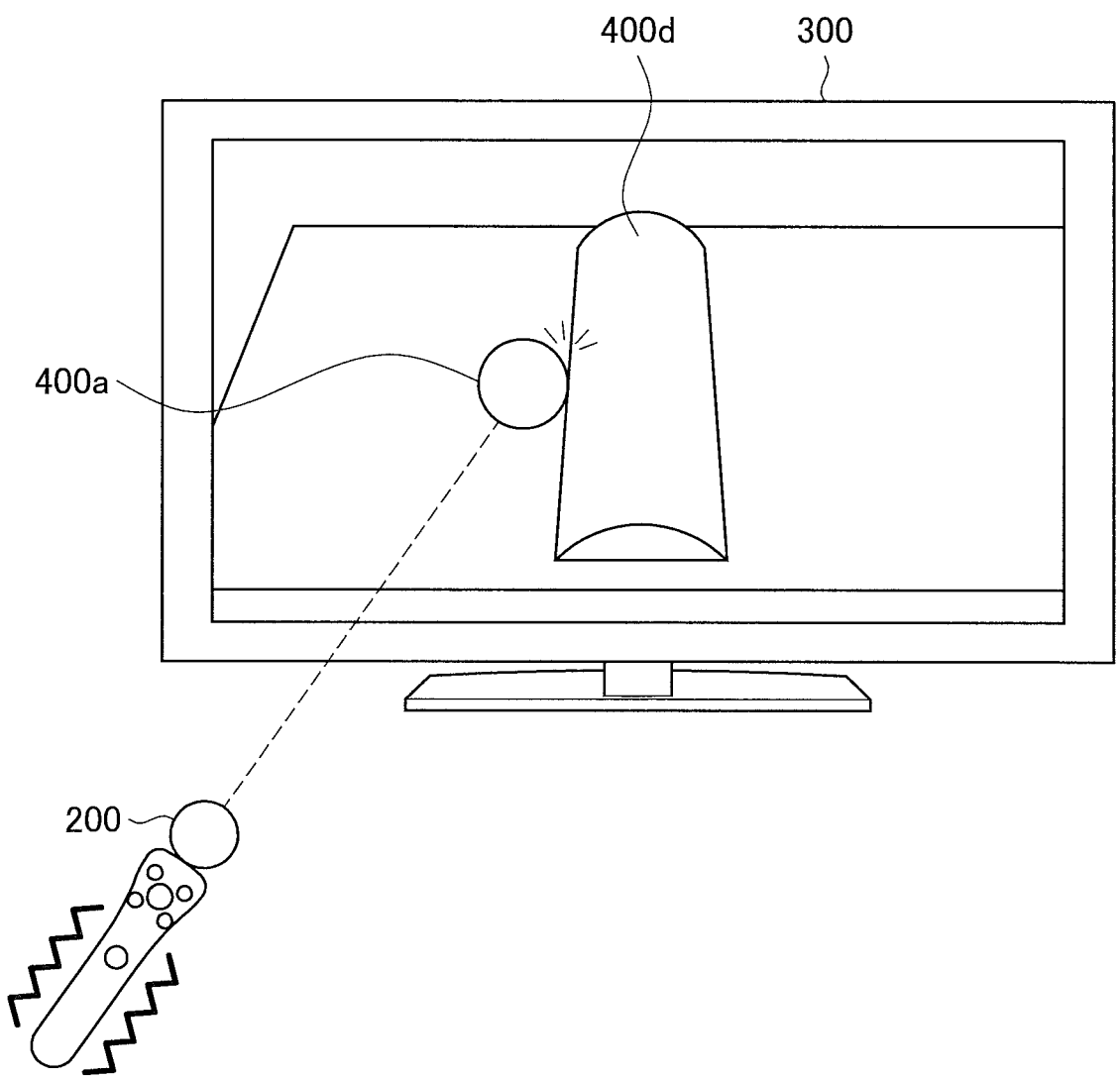
FIG. 9 is a diagram illustrating a method in which a shape and texture of a virtual object are expressed by vibration.
Figure 10:
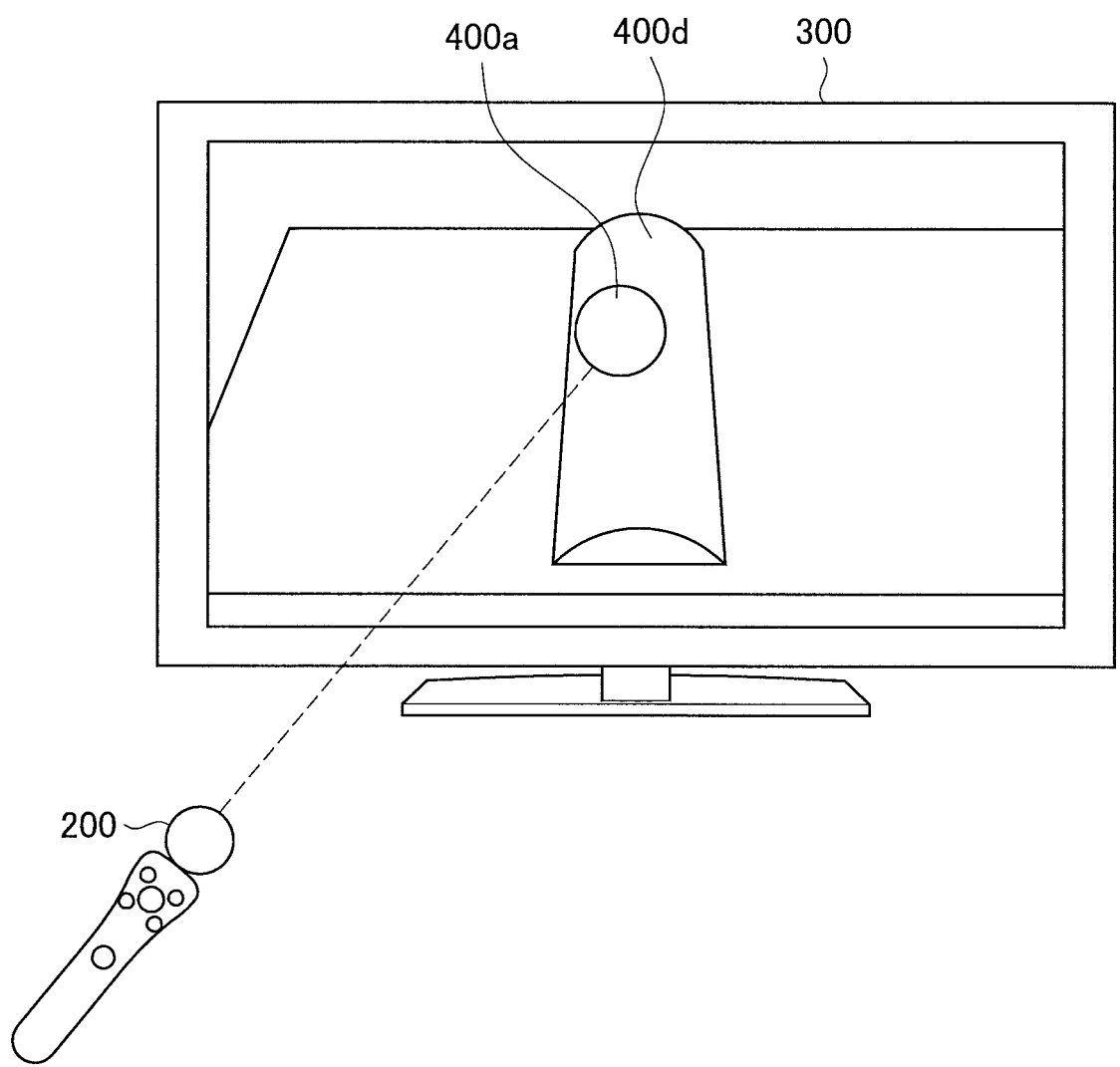
FIG. 10 is a diagram illustrating a method in which a shape and texture of a virtual object are expressed by vibration.
Figure 11:
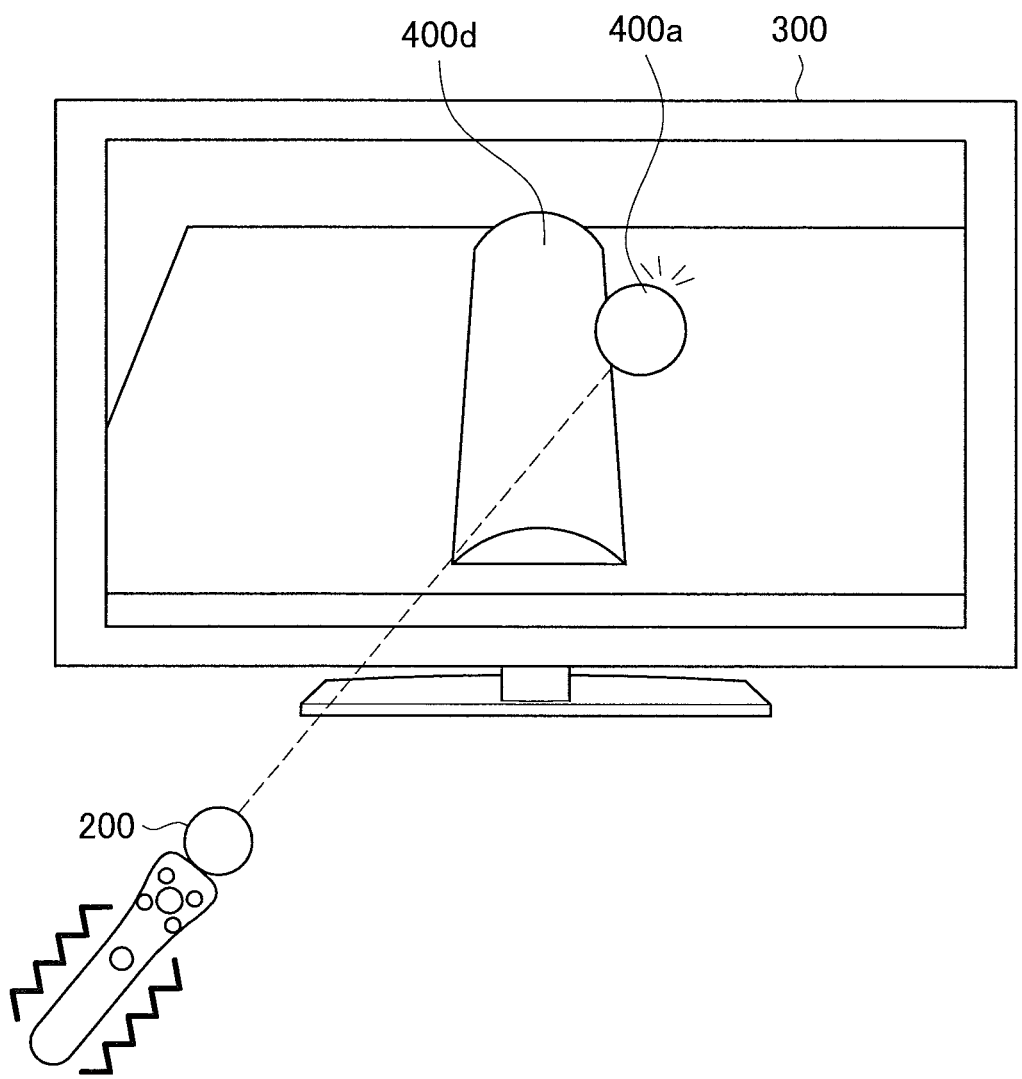
FIG. 11 is a diagram illustrating a method in which a shape and texture of a virtual object are expressed by vibration.

As illustrated in FIGS. 8 to 9, when the virtual manipulation object 400*a* moves and comes into contact with an end portion of the semicircular virtual object 400*d*, feedback of vibration with a short vibration time is given. Then, as illustrated in FIG. 10, the feedback of the vibration is not given while the virtual manipulation object 400*a* is moving on the surface of the semicircular virtual object 400*d*. Then, as illustrated in FIG. 11, when the virtual manipulation object 400*a* gets down to the other end of the semicircular virtual object 400*d*, feedback of vibration with a short vibration time is given again.

As described above, the vibration having the short vibration time is presented to the user at a timing at which the shape of the surface with which the virtual manipulation object 400*a* comes into contact changes (in the states illustrated in FIGS. 9 and 11), and thus the user can feel the change in the shape of the surface. Further, while the virtual manipulation object 400*a* is moving on the surface with small friction (in the state in FIG. 10), since the vibration is not presented, the user can feel the slippery feel. Further, at this time, since the virtual manipulation object 400*a* moves along the surface of the semicircular virtual object 400*d*, the user can feel a swollen shape of the semicircular virtual object 400*d* even through a sense of vision.

Figure 12:
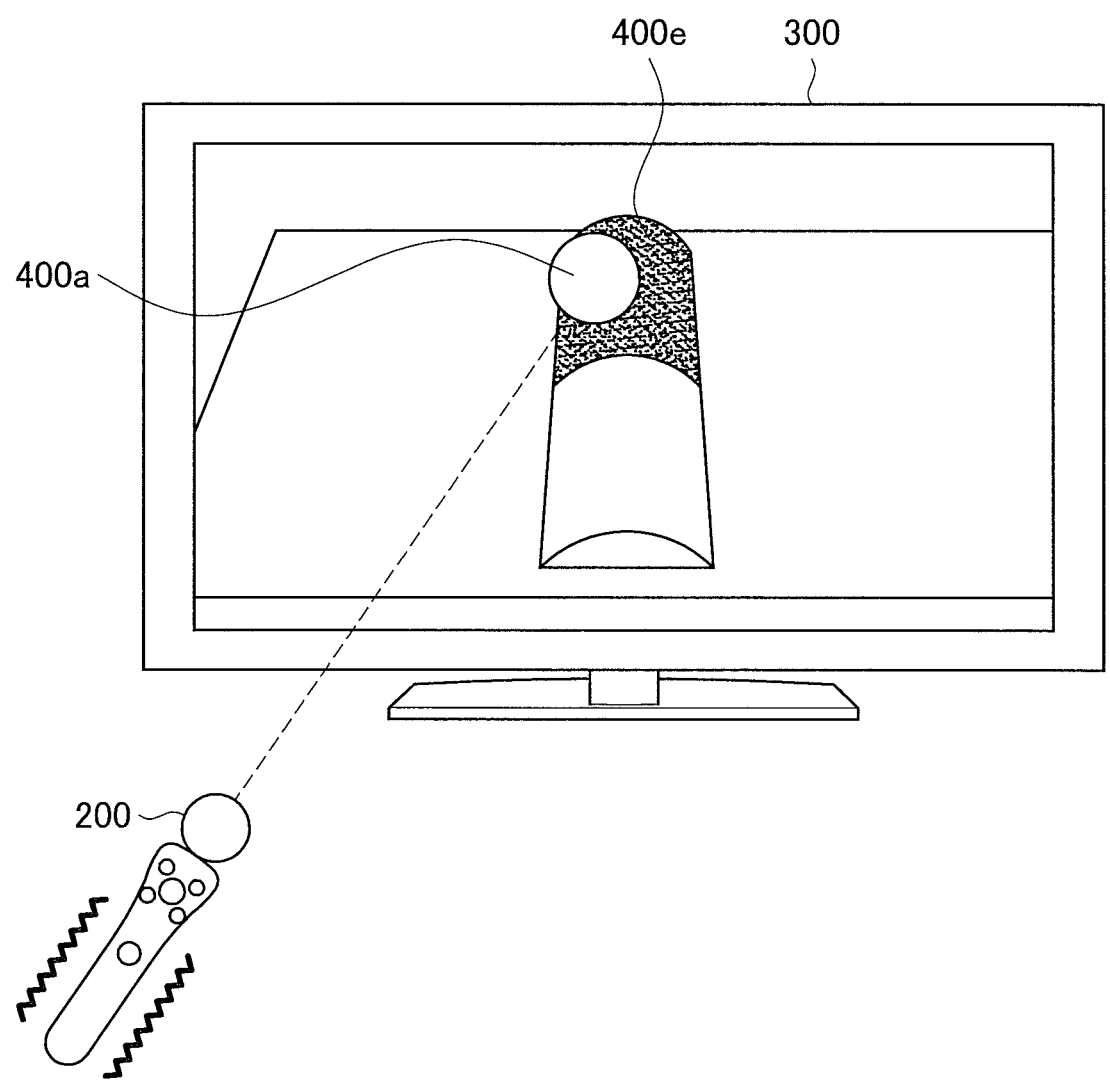
FIG. 12 is a diagram illustrating a method in which a shape and texture of a virtual object are expressed by vibration.

Further, in a case in which the virtual manipulation object 400*a* moves on a surface having large friction (having a rough feel), different vibration feedbacks may be given. FIG. 12 is a diagram illustrating an example in which a part 400*e* of the semicircular virtual object has a surface having large friction. At this time, when the virtual manipulation object 400*a* moves on the surface 400*e* having the large friction of the semicircular virtual object, vibration giving the user with a friction feeling is continuously provided to the user, and thus the user has a rough feel. Further, the vibration may change in accordance with a speed at which the user manipulates the virtual manipulation object 400*a*. For example, in the example of FIG. 12, as the speed at which the user manipulates the virtual manipulation object 400*a* increases, a time interval in which the controller 200 vibrates may decrease.

Further, in a case in which the virtual manipulation object 400*a* moves from a surface with small friction to a surface with large friction, the vibration to be given to the user changes, and thus the user can feel a change in the texture from the change in the vibration.

7. Wearable Terminal with Plurality of Vibrating Devices

The example in which the feedback of the vibration is given by the device grasped by the user such as the controller 200 have been described above. A jacket type wearable terminal having a plurality of vibrating devices 208 will be described below.

Figure 13:
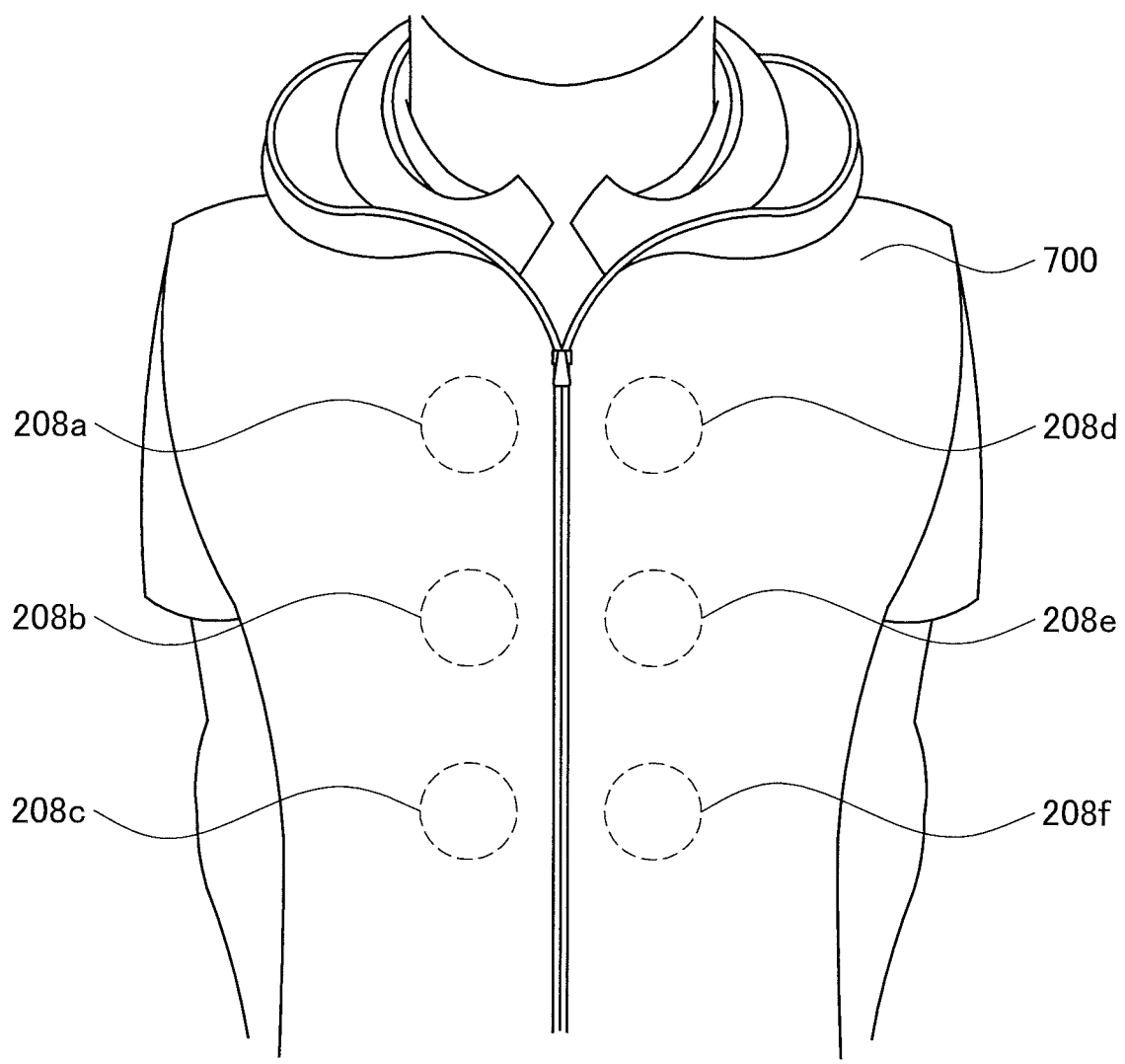
FIG. 13 is a diagram illustrating an example of a wearable terminal including a plurality of vibrating devices in an embodiment of the present disclosure.

FIG. 13 is a diagram illustrating an example of an external appearance of a jacket type wearable terminal 700. The jacket type wearable terminal 700 includes a plurality of vibrating devices 208a to 208f. Further, a plurality of vibrating devices 208a to 208f may be placed to be bilaterally symmetric as illustrated in FIG. 13.

Figure 14:
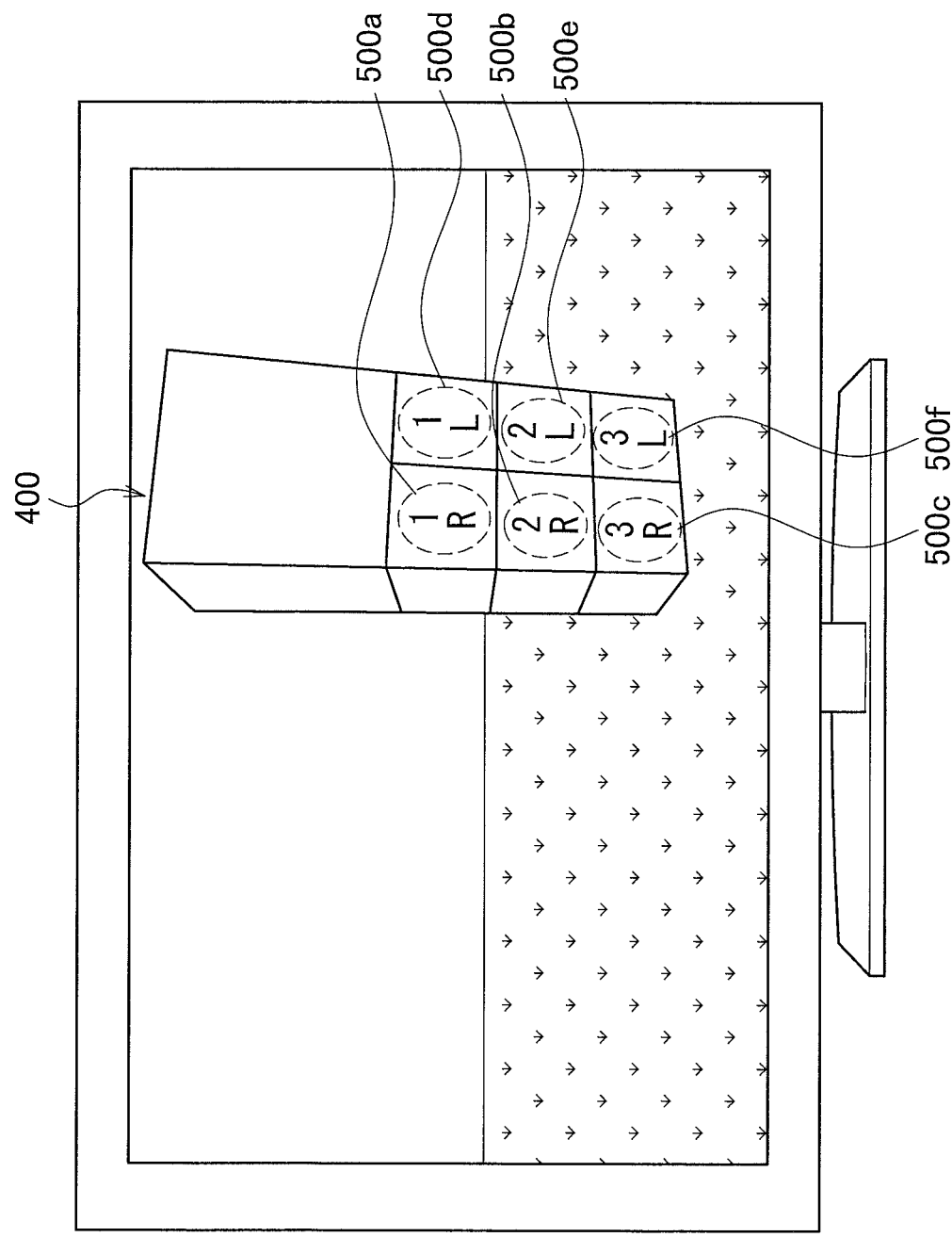
FIG. 14 is a diagram illustrating an example of a virtual object in which a plurality of listeners are placed in an embodiment of the present disclosure.

FIG. 14 is a diagram illustrating an example in which listeners 500a to 500f are placed in the virtual manipulation object 400a to correspond to the jacket type wearable terminal 700. Each of the listeners 500a to 500f corresponds to each of the vibrating devices 208a to 208f of the jacket type wearable terminal 700. As described above, when another virtual object 400 comes into contact with the listener 500a to 500f, the vibrating device 208 corresponding to the contacted listener 500 vibrates. For example, when another virtual object 400 comes into contact with the listener 500a, the vibrating device 208a vibrates, and thus the vibration is fed back to the user.

Figure 15:
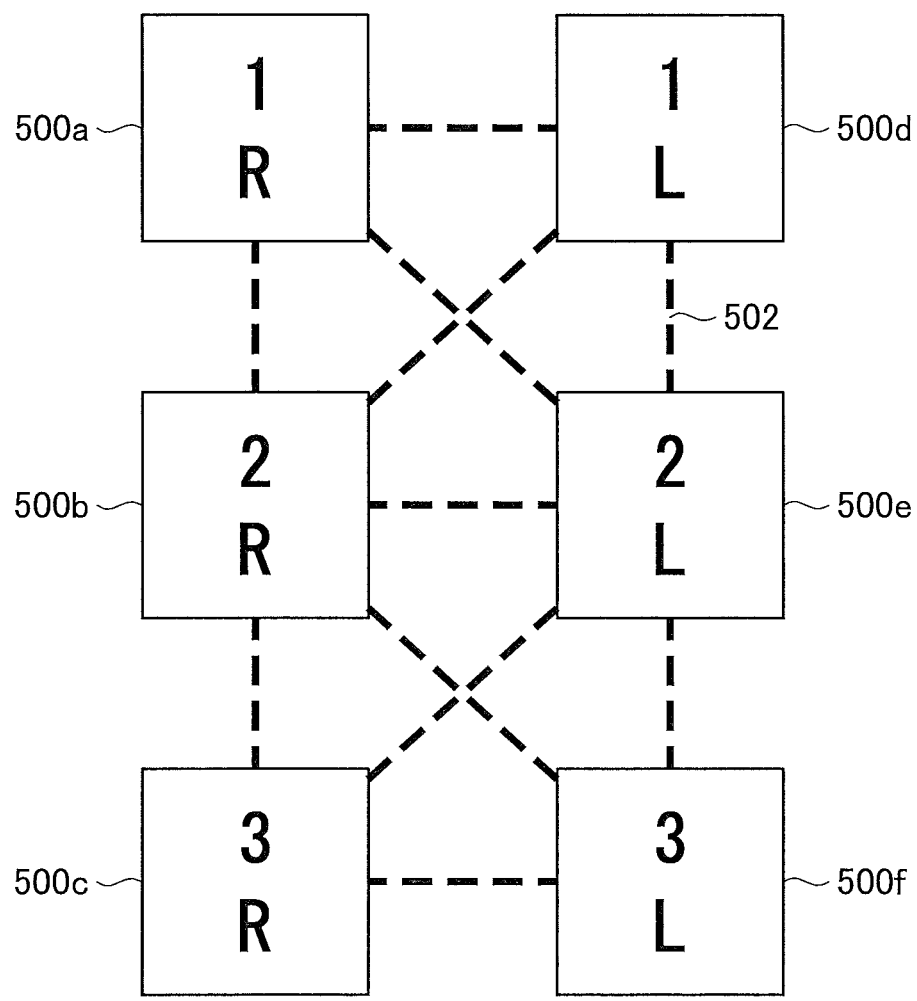
FIG. 15 is a diagram illustrating a coupling element of a plurality of listeners in an embodiment of the present disclosure.

As illustrated in FIG. 13 and FIG. 14, in a case in which a plurality of listeners 500 are placed for a plurality of vibrating devices 208, the feedback of the vibration may be given on the basis of a coupling relation of a plurality of listener 500. FIG. 15 is a diagram illustrating a coupling relation of such a plurality of listeners 500. Dotted lines illustrated in FIG. 15 are coupling elements 502 indicating a coupling relation of a plurality of listeners 500. The coupling element 502 may be a spring element, a damper element, or a time delay element. In other words, the coupling element 502 is an element related to a propagation characteristic of a shock and may be an element related to a propagation speed or attenuation of propagation.

The propagation of the vibration is simulated in accordance with the coupling element 502, and the vibration caused by the contact occurring in one listener 500 is propagated to the surrounding listeners 500. For example, in a case in which another virtual object 400 comes into contact with the listener 500a, the vibration may be transferred to the listener 500b, 500d, and 500e.

Further, as the coupling element 502 is the time delay element, the surrounding listeners 500 vibrate at a timing later than the listener 500 in which a collision occurs. For example, in a case in which another virtual object 400 comes into contact with the listener 500a, the vibration may be first transferred to the listeners 500b, 500d, and 500e, and the vibration may be slightly delayed and then transferred to the listeners 500c and 500f. Accordingly, the user can feel the spread of vibration.

Further, when the coupling element 502 is a spring element, the user can have a sense of touch such as a collision of an object having repulsive force (for example, an object such as a ball having gas therein). Further, when the coupling element 502 is a damper element, the user can have a sense of touch as if the user were wearing clothes capable of absorbing shocks.

As described above, since the feedback of the vibration is given on the basis of the coupling relation of a plurality of listeners 500, the user can feel the feedback of more various vibrations.

Figure 16:
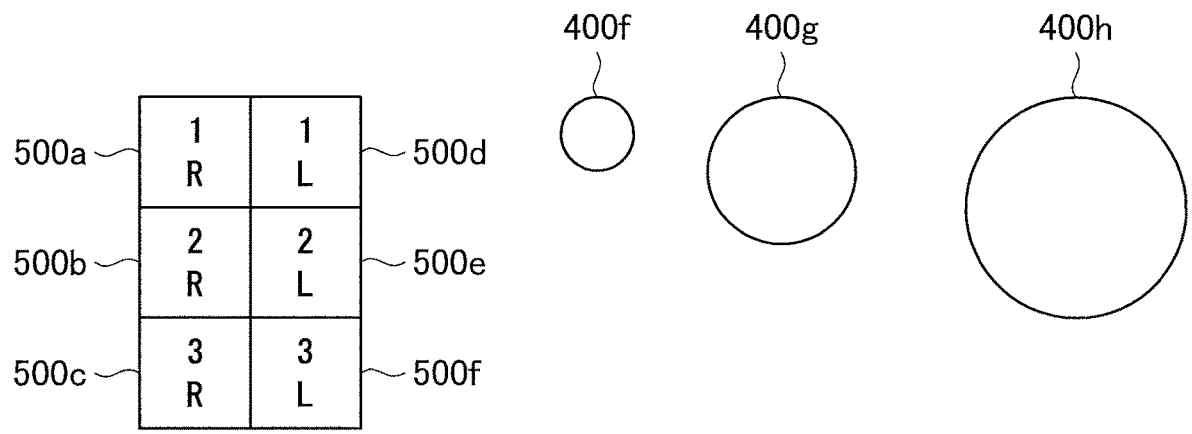
FIG. 16 is a diagram illustrating an example of a relation between a plurality of listeners and a size of a colliding virtual object.

Further, the number of listener 500 for detecting a collision may change depending on the size of the colliding virtual object 400. FIG. 16 is a diagram illustrating a relation between the size of the colliding virtual object 400 and the listener 500 for detecting a collision.

For example, as illustrated in FIG. 16, in a case in which the virtual object 400f having a diameter smaller than a width or a height of one listener 500 collides with the listener 500, one listener 500 may detect the collision. Further, in a case in which the virtual object 400g having a diameter larger than a width or a height of one listener 500 and smaller than two listeners 500 collides with the listener 500, two listeners 500 in the vertical direction and two listeners 500 in the horizontal direction, that is, a total of four listeners 500 may detect the collision. Further, in a case in which the virtual object 400h having a diameter larger than a width or a height of two listeners 500 and smaller than three listeners 500 collides with the listener 500, three listeners 500 in the vertical direction and two listeners 500 in the horizontal direction, that is, a total of six listeners 500 may detect the collision.

Further, the number of listeners 500 for detecting a collision may change depending on the mass or the speed of the colliding virtual object 400 or the magnitude of kinetic energy of the virtual object 400 obtained from the mass or the speed. Further, the strength of vibration to be provided may change at the same time. In other words, as the mass, the speed, or the kinetic energy of the colliding virtual object 400 increases, the number of listeners 500 for detecting a collision may increase, or the strength of vibration may increase.

Further, the number of listener 500 for detecting a collision and the strength of vibration may change on the basis of the attribute of the virtual manipulation object 400a in which the listener 500 is placed. For example, in a case in which the virtual manipulation object 400a in which a plurality of listeners 500 are placed has an attribute of absorbing shocks such as rubber, the number of listener 500 for detecting collision may be reduced. Further, the magnitude of vibration to be fed back to the user through a collision may be reduced at this time.

8. Detection Mode in which Listener Detects Contact

The example in which a plurality of listeners 500 for a plurality of vibrating devices 208 are placed in the virtual manipulation object 400a has been described above. A range in which the listener 500 detects the contact will be described below. As described above, the listener 500 placed in the virtual manipulation object 400a detects the contact with another virtual object 400. However, a frequency of thinking that the user desires to receive feedback may differ depending on the user.

In this regard, in the present embodiment, a plurality of modes that differ in the range in which the listener 500 detects the contact are provided. A plurality of modes include a "mode in which the listener 500 does not detect vibration at all." a "mode in which the listener 500 detects vibration when the virtual object 400 comes into contact with the listener 500," and a "mode in which the listener 500 detects all vibrations." Here, a different point between the "mode in which the listener 500 detects the vibration when the virtual object 400 comes into contact with the listener 500" and the "mode in which the listener 500 detects all vibration" may be, for example, whether or not the shock wave 802 generated by the shock wave generation source 800 is detected or may be whether or not the vibration caused by a contact with the virtual object 400 having a specific attribute is detected.

Further, the listener 500 detects a sound as well as described above. Accordingly, similarly, a plurality of modes in which the range in which the listener 500 detects the sound may be set. For example, a plurality of modes related to the sound include a "mode in which the listener 500 does not detect any sound," a "mode in which the listener 500 detects a certain range of sound," and a "mode in which the listener 500 detects all sounds."

Since a plurality of modes related to the range in which the listener 500 detects the vibration and the sound are set as described above, the user can select the mode suitable for his/her preference.

Further, within the virtual space, the virtual manipulation object 400*a* manipulated by the user may come into contact with other virtual objects 400 at a location which the user does not intend. For example, in a case in which the user is manipulating a human-like virtual manipulation object 400*a*, the virtual manipulation object 400*a* may come into contact with the virtual object 400) such as grass or stone at the foot of the human-like virtual manipulation object 400*a*. In this case, it is undesirable that the listener 500 detect all contacts and give the feedback of the vibration to the user.

In this regard, in the present embodiment, in addition to the mode related to the range in which the listener 500 detects the vibration and the sound, a mode in which the listener 500 detects the vibration and the sound on the basis of information provided from a line-of-sight detecting device may be set.

Figure 17:
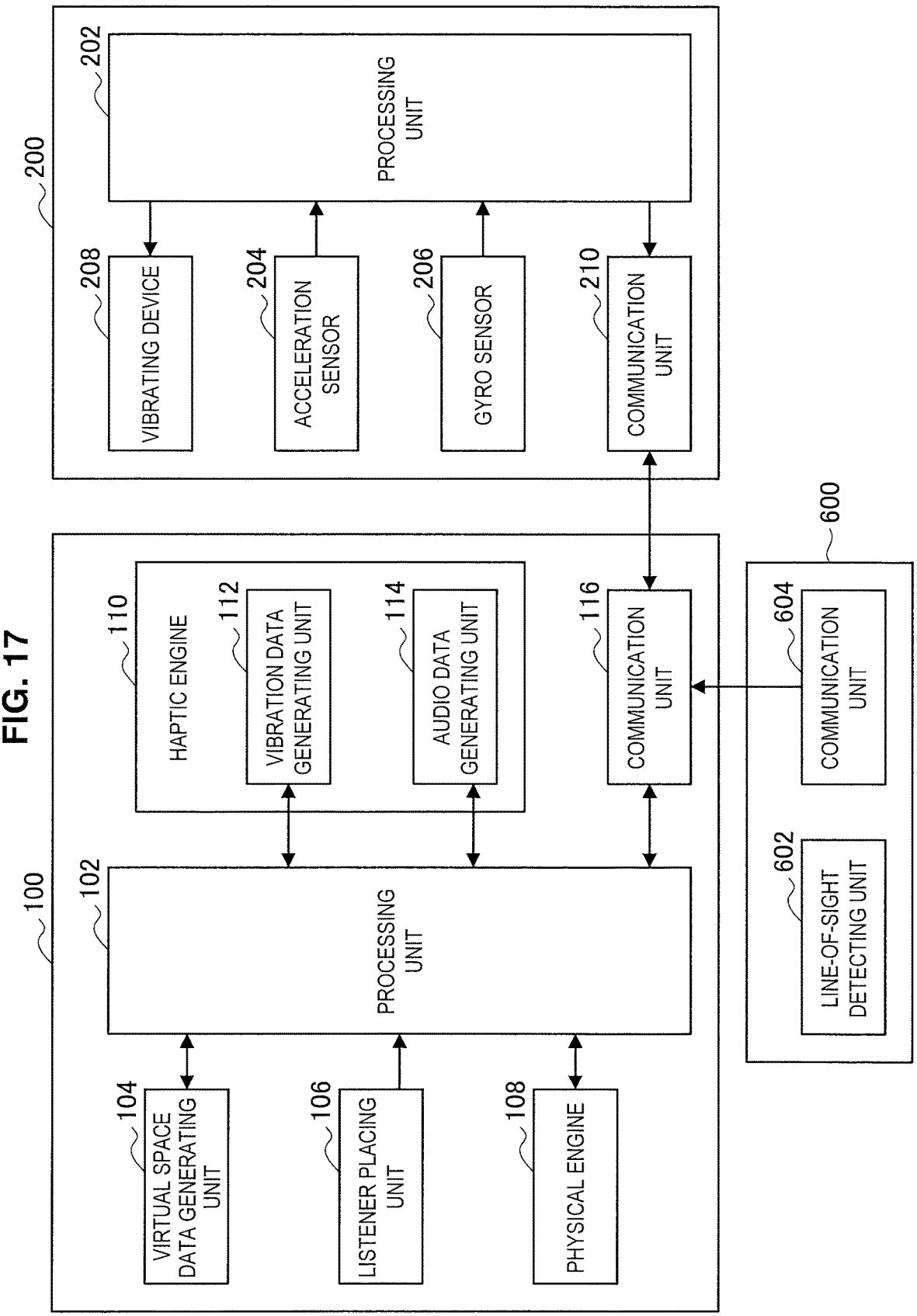
FIG. 17 is a block diagram illustrating another example of a configuration of a system according to an embodiment of the present disclosure.

FIG. 17 is a diagram illustrating a configuration of a system including a line-of-sight detecting device 600. The system according to the present embodiment includes the line-of-sight detecting device 600 that detects the line of sight of the user, and the line-of-sight detecting device 600 includes a communication unit 604 that wirelessly connects a line-of-sight detecting unit 602 with the game machine 100.

The line-of-sight detecting device 600 may be, for example, a device attached to the head of the user (for example, a device such as a headgear). In this case, the line-of-sight detecting unit 602 may include an imaging unit and detect the line of sight of the user on the basis of an image captured by the imaging unit. Further, the line-of-sight detecting unit 602 may be a gyro sensor and/or an acceleration sensor and detect the line of sight of the user on the basis of an angular speed, an angular acceleration, or an acceleration detected by the sensor.

In a case in which the system according to the present embodiment has the configuration described above, the listener 500 may detect a contact between the virtual manipulation object 400*a* and the virtual object 400 within the field of view of the user in the virtual space based on the information provided from the line-of-sight detecting device 600. At this time, the listener 500 may not detect the contact between the virtual manipulation object 400*a* and the virtual object 400 which is not within the field of view of the user in the virtual space.

When the information related to the field of view of the user in the virtual space based on the information provided from the line-of-sight detecting device 600 is used as described above, the vibration is prevented from frequently occurring at a timing that the user does not expect, and the feedback of the vibration is obtained when the user pays attention to a certain virtual object 400.

Further, in the above embodiment, the line-of-sight detecting device 600 is used to detect the field of view of the user in the virtual space. However, in the case of a normal display, a range drawn in the display may be the range of the field of view of the user.

9. Wearable Terminal with Speaker

Figure 18:
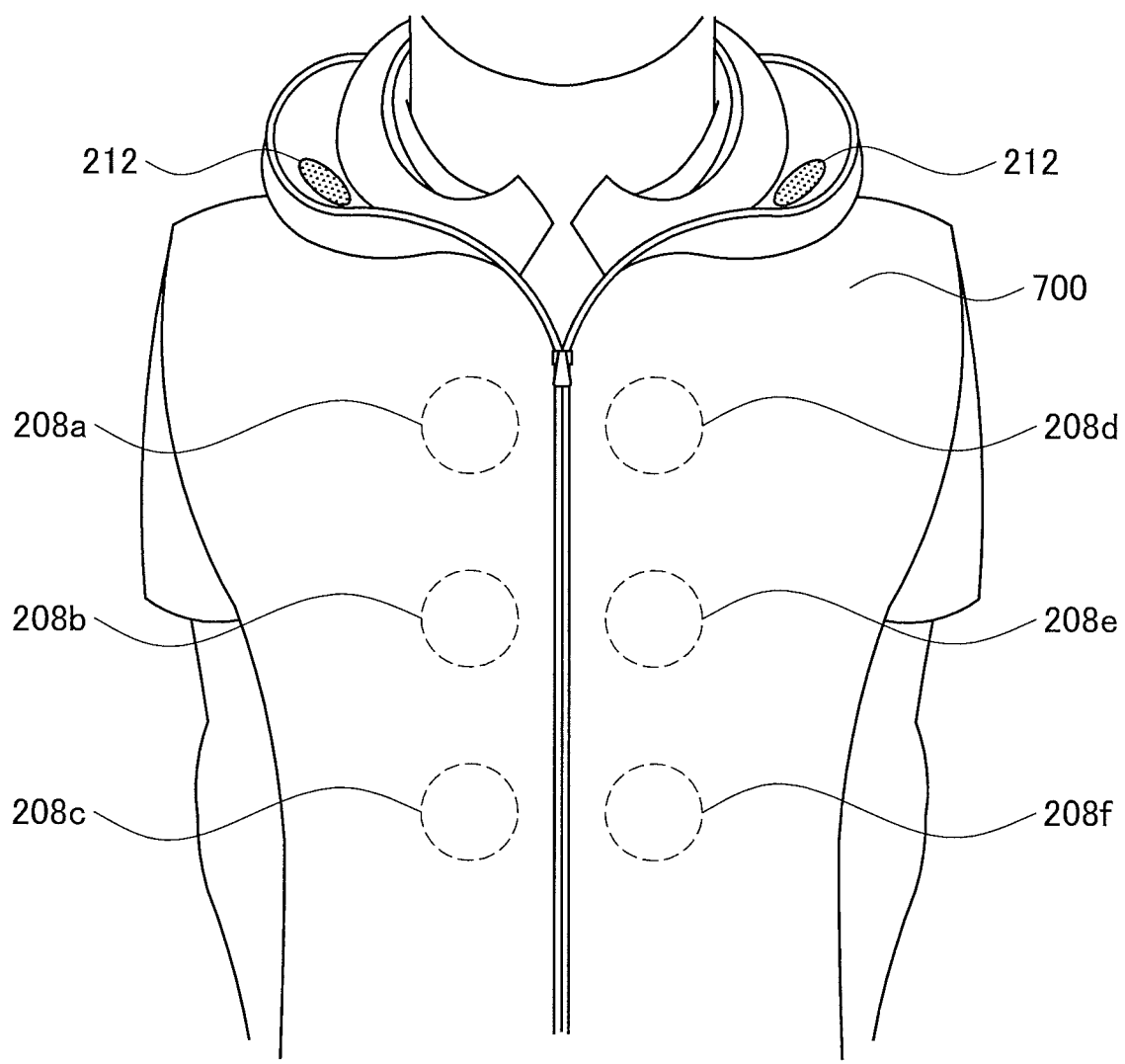
FIG. 18 is a diagram illustrating another example of a wearable terminal including a plurality of vibrating devices in an embodiment of the present disclosure.

The example of the system including the line-of-sight detecting device 600 has been described above. An operation of the jacket type wearable terminal 700 including a speaker will be described below. FIG. 18 is a diagram illustrating an external appearance of the jacket type wearable terminal 700 including a speaker 212. As can be understood from FIG. 18, the speaker 212 is placed at a position close to the ear of the user.

The vibration and the sound are separately provided to the user by the jacket type wearable terminal 700 including the vibrating device 208 capable of outputting the sound such as the voice coil motor and the speaker 212 illustrated in FIG. 18, and the position relation of the virtual object 400 is expressed.

For example, since a person perceives a direction of a sound generation source on the basis of a volume difference and a phase difference of the left and right ears, the direction of the sound generation source is expressed by the sound output from the speaker 212. Further, since a distance to the sound generation source is mainly perceived on the basis of the magnitude of the sound, the position at which the virtual object 400 comes into contact with in the virtual space can be expressed by changing the magnitude of the sound output from the vibrating device 208 such as the voice coil motor.

At this time, for example, in a case in which a contact with the virtual object 400 occurs at the chest of the user in the virtual space, in the descending order of the distances from the chest of the user, a large sound is output from the vibrating devices 208*a* and 208*d*, a moderate sound is output from the vibrating devices 208*b* and 208*e*, and a small sound is output from the vibrating devices 208*c* and 208*f*. At this time, for example, control may be performed such that a low volume is output from the vibrating device 208 at a distant position in inverse proportion to the square of the distance from the ear of the user to the vibrating device 208.

Further, since it is preferable that the user does not hear a vibration sound generated when the vibrating device 208 vibrates, the speaker 212 or another vibrating device 208 may be controlled such that the vibration sound of the vibrating device 208 is negated. At this time, in the jacket type wearable terminal 700, since a relative position of the speaker 212 to the ear of the user is fixed, the speaker 212 may be controlled on the basis of a waveform input to the vibrating device 208 such that the vibration sound of the vibrating device 208 is negated without using a microphone.

Further, it is possible to negate the vibration sound of the vibrating device 208 with a high degree of accuracy and negate ambient sounds by placing a microphone near the speaker 212, detecting a sound supposed to reach the ear of the user through the microphone, and reproducing a sound of a reverse phase in real time.

10. Vibration Data Generation Method

The operation of the jacket type wearable terminal 700 including the speaker 212 has been described above. A vibration data generation method used in the system according to the present embodiment will be described below. FIGS. 19 to 22 are diagrams illustrating a process of generating the vibration data used in the system according to the present embodiment.

A left diagram of FIG. 19 illustrates a waveform obtained by sampling acceleration data when a real object (for example, a surface having a large friction coefficient) is traced through an acceleration sensor. Further, a right diagram of FIG. 19 is a graph illustrating a frequency component of the sampled waveform (the left diagram of FIG. 19).

Figure 21:
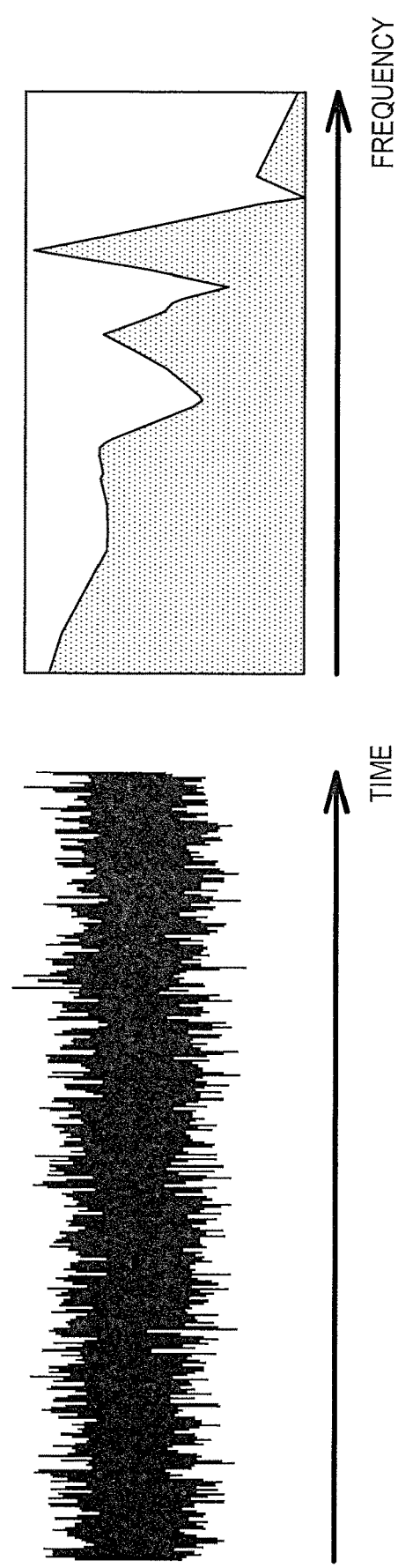
FIG. 21 is a diagram illustrating a vibration data generation method in an embodiment of the present disclosure.

FIG. 20 illustrates waveform of a pink noise and a graph of a frequency component. A left diagram of FIG. 21 illustrates a waveform when an equalizer is applied to the pink noise of FIG. 20 using a frequency characteristic illustrated in the right diagram of FIG. 19.

As described above, the vibration data used in the system according to the present embodiment is generated by applying the equalizer to the pink noise on the basis of the waveform obtained from the real object. Then, the "equalized pink noise" is reproduced in accordance with the speed of the virtual manipulation object 400*a*. Accordingly, a "continuous haptic expression" and a "haptic expression specific to an object" are implemented.

11. Supplement

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above example, the vibration data has been described as an example of haptic data. However, the haptic data is not limited to the vibration data. For example, the haptic data may be haptic data related to an electric stimulus or may be haptic data related to heat. At this time, the listener 500 may detect heat or an electric stimulus.

Further, similarly to the vibration data described above, the haptic data related to heat or an electric stimulus may be generated on the basis of the attribute of the virtual object 400. For example, when the virtual manipulation object 400*a* has the attribute of metal, since the metal has high thermal conductivity, the haptic data may be generated so that heat is rapidly transferred. On the other hand, when the virtual manipulation object 400*a* has the attribute of wood, since the wood has lower thermal conductivity than the metal, the haptic data may be generated so that the heat is transferred more gently than in a case in which the heat source swings to the virtual object 400 having the attribute of metal. Further, similarly, when the virtual manipulation object 400*a* has the attribute of metal, since the metal has high electric conductivity, the haptic data may be generated so that a strong electric stimulus is fed back to the user. On the other hand, when the virtual manipulation object 400*a* has the attribute of wood, since the wood has lower electric conductivity than the metal, the haptic data may not be generated.

Further, the example in which the listener 500 detects the shock wave 802 generated from the shock wave generation source 800 at a position away from the virtual manipulation object 400*a* has been described above. At this time, the jacket type wearable terminal 700 vibrates, but the controller 200 grasped by the user may not vibrate. In other words, the haptic feedback may differ depending on a configuration (or a type) of device.

Further, the physical engine 108 and the haptic engine 110 may be implemented using a general-purpose processor. Further, a computer program for operating the processor as described above may be provided. Further, a storage medium having the program stored therein may be provided.

12. Conclusion

As described above, in the system according to the present disclosure, the vibration data is generated in accordance with the attribute information associated with the virtual object 400. Further, in the system according to the present disclosure, the vibration data is generated on the basis of the relative speed or contact position when the virtual manipulation object 400*a* in which the listener 500 is placed comes into contact with another virtual object 400. Accordingly, the user can receive the feedback of the vibration with the sense of presence.

Further, in the system according to the present disclosure, the vibration data is generated on the basis of the attribute information associated with another virtual object 400 coming into contact with the virtual manipulation object 400*a* in which the listener 500 is placed. The user wants to receive the haptic feedback of the virtual object 400 coming into contact with the virtual manipulation object 400*a* instead of the sense of touch of the virtual manipulation object 400*a* manipulated by the user when performing a game or the like. Thus, with the above configuration, the user can receive the feedback with a more sense of presence.

Further, in the system according to the present disclosure, the virtual object 400 has the vibration data corresponding to the attribute information, and thus the vibration data is generated in real time. Further, since the vibration data is mapped with each virtual object 400, it is possible to easily provide the vibration data to each virtual object 400.

Further, in the system according to the present disclosure, the feedback of the vibration is given on the basis of the coupling relation of a plurality of listeners 500, and thus the user can feel the feedback of various vibrations.

Additionally, the present technology may also be configured as below.

(1)

An information processing device, including:

a virtual space data generating unit configured to generate data related to a virtual space including a virtual object having an attribute;

a listener placing unit configured to place a listener for detecting a contact with the virtual object;

a virtual object in which the listener is placed; and a haptic data generating unit configured to generate haptic data for causing a haptic device to be operated on a basis of at least one of attribute information of the virtual object and attribute information of another virtual object when the virtual object comes into contact with the other virtual object.

(2)

The information processing device according to (1), in which the virtual object in which the listener is placed is the virtual object manipulated by a user.

(3)

The information processing device according to (1) or (2), in which the haptic data is data related to vibration.

(4)

The information processing device according to any one of (1) to (3), in which the virtual space data generating unit forms the virtual object so that an attribute is associated with the virtual object.

(5)

The information processing device according to (4), in which the attribute information of the virtual object includes at least one of a mass, a degree of rigidity, a material, a size, a shape, a position, and a speed of the virtual object.

(6)
The information processing device according to (5),
in which the haptic data generating unit generates the haptic data on a basis of the attribute of the virtual object manipulated by the user.

(7)
The information processing device according to (5),
in which the haptic data generating unit generates the haptic data on a basis of the attribute of the other virtual object different from the virtual object manipulated by the user.

(8)
The information processing device according to (5),
in which the haptic data generating unit generates the haptic data on a basis of both the attribute of the virtual object manipulated by the user and the attribute of the other virtual object different from the virtual object manipulated by the user.

(9)
The information processing device according to any one of (1) to (8),
in which the haptic data generating unit further generates the haptic data in accordance with a relative speed or a contact position between the virtual object in which the listener is placed and another virtual object.

(10)
The information processing device according to any one of (1) to (9),
in which the haptic data generating unit generates the haptic data based on a shock generation source that exists at a position away from the virtual object in which the listener is placed.

(11)
The information processing device according to (10),
in which the haptic data generating unit generates the haptic data on a basis of a medium between the virtual object in which the listener is placed and the shock generation source.

(12)
The information processing device according to any one of (1) to (11),
in which the listener placing unit places a plurality of the listeners in the virtual object, and
the haptic data generating unit generates the haptic data for the haptic device corresponding to another listener among the plurality of listeners on a basis of the haptic data for the haptic device corresponding to at least one of the plurality of listeners and a coupling relation between the plurality of listeners.

(13)
The information processing device according to (12),
in which the coupling relation relates to a propagation characteristic.

(14)
The information processing device according to (13),
in which the propagation characteristic relates to a propagation speed or attenuation of propagation.

(15)
The information processing device according to any one of (1) to (14),
in which the haptic data generating unit further generates the haptic data on a basis of information provided from a line-of-sight detecting unit configured to detect a line of sight of a user.

(16)
The information processing device according to (15),
in which the haptic data generating unit generates the haptic data on a basis of a contact between the virtual object in a field of view of the user in the virtual space and the virtual object manipulated by the user.

(17)
The information processing device according to any one of (1) to (16),
in which the haptic data is data related to an electric stimulus or heat.

(18)
A method, including:
generating data related to a virtual space including a virtual object having an attribute;
placing a listener for detecting a contact with the virtual object;
causing the listener to be placed in the virtual object; and
generating haptic data for causing a haptic device to be operated on a basis of at least one of attribute information of the virtual object and attribute information of another virtual object when the virtual object comes into contact with the other virtual object.

(19)
A computer program causing a processor to execute
generating data related to a virtual space including a virtual object having an attribute,
placing a listener for detecting a contact with the virtual object,
causing the listener to be placed in the virtual object, and
generating haptic data for causing a haptic device to be operated on a basis of at least one of attribute information of the virtual object and attribute information of another virtual object when the virtual object comes into contact with the other virtual object.

REFERENCE SIGNS LIST 100 game machine
102 processing unit
104 virtual space data generating unit
106 listener placing unit
108 physical engine
110 haptic engine
112 vibration data generating unit
114 audio data generating unit
116 communication unit
200 controller
202 processing unit
204 acceleration sensor
206 gyro sensor
208 vibrating device
210 communication unit
212 speaker
300 display device
400 virtual object
400a virtual manipulation object
500 listener
502 coupling element
600 line-of-sight detecting device
602 line-of-sight detecting unit
604 communication unit
700 wearable terminal
800 shock wave generation source
802 shock wave

The invention claimed is:
1. An information processing device, comprising:
a virtual space data generating unit configured to generate data related to a virtual space including a first virtual object manipulated by a user, the first virtual object having a plurality of areas for detecting contact with a second virtual object; and a haptic data generating unit configured to generate haptic data for causing one or more haptic devices among a plurality of haptic devices, each haptic device of the plurality of haptic devices corresponding to a respective area of the plurality of areas of the first virtual object, to be operated based on at least one of attribute information associated with the first virtual object or attribute information associated with the second virtual object when the second virtual object comes into contact with at least one area of the plurality of areas of the first virtual object, wherein the haptic data is generated based on the at least one area of the plurality of areas of the first virtual object, wherein the haptic data generating unit generates the haptic data for the one or more haptic devices corresponding to one or more areas among the plurality of areas based on a coupling relation between the plurality of areas, and wherein the virtual space data generating unit and the haptic data generating unit are each implemented via at least one processor.

2. The information processing device according to claim 1,
wherein the haptic data comprises data related to vibration.

3. The information processing device according to claim 1,
wherein the attribute information associated with the first virtual object includes at least one of a mass, a degree of rigidity, a material, a size, a shape, a position, or a speed of the first virtual object, and
wherein the attribute information associated with the second virtual object includes at least one of a mass, a degree of rigidity, a material, a size, a shape, a position, or a speed of the second virtual object.

4. The information processing device according to claim 3,
wherein the haptic data generating unit generates the haptic data based on the attribute information associated with the first virtual object manipulated by the user.

5. The information processing device according to claim 3,
wherein the haptic data generating unit generates the haptic data based on the attribute information associated with the second virtual object different from the first virtual object manipulated by the user.

6. The information processing device according to claim 3,
wherein the haptic data generating unit generates the haptic data based on both the attribute information associated with the first virtual object manipulated by the user and the attribute information associated with the second virtual object different from the first virtual object manipulated by the user.

7. The information processing device according to claim 1,
wherein the haptic data generating unit further generates the haptic data in accordance with a relative speed or a contact position between the first virtual object and the second virtual object.

8. The information processing device according to claim 1,
wherein the haptic data generating unit generates the haptic data based on a shock generation source that exists at a position away from the first virtual object.

9. The information processing device according to claim 8,
wherein the haptic data generating unit generates the haptic data based on a medium between the first virtual object and the shock generation source.

10. The information processing device according to claim 1,
wherein the coupling relation relates to a propagation characteristic.

11. The information processing device according to claim 10,
wherein the propagation characteristic relates to a propagation speed or attenuation of propagation.

12. The information processing device according to claim 1,
wherein the haptic data generating unit further generates the haptic data based on information provided from a line-of-sight detecting unit configured to detect a line of sight of the user.

13. The information processing device according to claim 12,
wherein the haptic data generating unit generates the haptic data based on the contact between the second virtual object and the first virtual object manipulated by the user when the second virtual object is determined to be in a field of view of the user based on the detected line of sight of the user.

14. The information processing device according to claim 1,
wherein the haptic data comprises data related to an electric stimulus or heat.

15. A method, implemented via at least one processor, the method comprising:
generating data related to a virtual space including a first virtual object manipulated by a user, the first virtual object having a plurality of areas for detecting contact with a second virtual object; and
generating haptic data for causing one or more haptic devices among a plurality of haptic devices, each haptic device of the plurality of haptic devices corresponding to a respective area of the plurality of areas of the first virtual object, to be operated based on at least one of attribute information associated with the first virtual object or attribute information associated with the second virtual object when the second virtual object comes into contact with at least one area of the plurality of areas of the first virtual object,
wherein the haptic data is generated based on the at least one area of the plurality of areas of the first virtual object, and
wherein the haptic data is generated for the one or more haptic devices corresponding to one or more areas among the plurality of areas based on a coupling relation between the plurality of areas.

16. A non-transitory computer-readable medium having embodied thereon a program, which when executed by a processor causes the processor to execute a method, the method comprising:
generating data related to a virtual space including a first virtual object manipulated by a user, the first virtual object having a plurality of areas for detecting contact with a second virtual object; and
generating haptic data for causing one or more haptic devices among a plurality of haptic devices, each haptic device of the plurality of haptic devices corresponding to a respective area of the plurality of areas of the first virtual object, to be operated based on at least one of attribute information associated with the first virtual object or attribute information associated with the second virtual object when the second virtual object comes into contact with at least one area of the plurality of areas of the first virtual object, wherein the haptic data is generated based on the at least one area of the plurality of areas of the first virtual object, and wherein the haptic data is generated for the one or more haptic devices corresponding to one or more areas among the plurality of areas based on a coupling relation between the plurality of areas.

* * * * *